(12) United States Patent
Hong et al.

(10) Patent No.: US 12,253,063 B2
(45) Date of Patent: Mar. 18, 2025

(54) CONTROLLING WIND TURBINE BASED ON WIND VEER

(71) Applicant: Regents of the University of Minnesota, Minneapolis, MN (US)

(72) Inventors: Jiarong Hong, New Brighton, MN (US); Linyue Gao, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 18/263,433

(22) PCT Filed: Jan. 26, 2022

(86) PCT No.: PCT/US2022/070356
§ 371 (c)(1),
(2) Date: Jul. 28, 2023

(87) PCT Pub. No.: WO2022/165489
PCT Pub. Date: Aug. 4, 2022

(65) Prior Publication Data
US 2024/0309841 A1 Sep. 19, 2024

Related U.S. Application Data

(60) Provisional application No. 63/199,871, filed on Jan. 29, 2021.

(51) Int. Cl.
*F03D 7/02* (2006.01)
(52) U.S. Cl.
CPC ........... *F03D 7/0204* (2013.01); *F03D 7/028* (2013.01); *F05B 2270/1033* (2013.01); *F05B 2270/32* (2013.01); *F05B 2270/321* (2013.01)

(58) Field of Classification Search
CPC .......................... F03D 7/0204; F05B 2270/321
See application file for complete search history.

(56) References Cited

U.S. PATENT DOCUMENTS 8,987,929 B2 * 3/2015 Jayant ..................... F03D 7/048
290/55
11,674,498 B1 * 6/2023 Evans ................... F03D 17/005
416/9

(Continued)

FOREIGN PATENT DOCUMENTS

EP 2927484 A1 10/2015
WO 2012044161 A2 4/2012

OTHER PUBLICATIONS

Abkar et al., "Wake flow in a wind farm during a diurnal cycle", Journal of Turbulence, vol. 17, No. 4, Apr. 2016, pp. 420-441.

(Continued)

*Primary Examiner* — Christopher R Legendre
(74) *Attorney, Agent, or Firm* — Shumaker & Sieffert, P.A.

(57) ABSTRACT

A method includes determining, by a control system, from among a plurality of categories, a current category of an incoming wind approaching a wind turbine, and setting, by the control system, a yaw bias of the wind turbine based on the current category. In some examples, the plurality of categories includes two or more wind conditions, such as a first wind condition in which wind contacting an upper rotor of the wind turbine is veering and wind contacting a lower rotor of the wind turbine is veering, a second wind condition in which the wind contacting the upper rotor of the wind turbine is veering and the wind contacting the lower rotor of the wind turbine is backing, and so on.

20 Claims, 17 Drawing Sheets

(56) References Cited

U.S. PATENT DOCUMENTS

| | | | | |
|---|---|---|---|---|
| 2015/0086357 | A1* | 3/2015 | Gregg | F03D 7/046 |
| | | | | 416/9 |
| 2015/0276786 | A1 | 10/2015 | Zuo et al. | |
| 2018/0119678 | A1 | 5/2018 | Lebosq | |
| 2024/0309841 | A1* | 9/2024 | Hong | F03D 7/028 |

OTHER PUBLICATIONS

Allaerts et al., "Large eddy simulation of a large wind-turbine array in a conventionally neutral atmospheric boundary layer", Physics of Fluids, vol. 27, No. 6, Jun. 2015, 22 pp.

Bardal et al., "Performance test of a 3MW wind turbine-effects of shear and turbulence", Energy Procedia, Jan. 2015, pp. 83-91.

Bastankhah et al., "Wind tunnel study of the wind turbine interaction with a boundary-layer flow: Upwind region, turbine performance, and wake region", Physics of Fluids, vol. 29, No. 6, Jun. 2017, 18 pp.

Bodini et al., "Spatial and temporal variability of turbulence dissipation rate in complex terrain", Atmospheric Chemistry and Physics, vol. 19, No. 7, Apr. 4, 2019, pp. 4367-4382.

Bodini et al., "U.S. East Coast Lidar Measurements Show Offshore Wind Turbines Will Encounter Very Low Atmospheric Turbulence", Geophysical Research Letters, vol. 46, No. 10, May 1, 2019, pp. 5582-5591.

Chamorro et al., "On the scale-to-scale coupling between a full-scale wind turbine and turbulence", J. Turbul, vol. 16, No. 7, 2015, pp. 617-632, (Applicant points out, in accordance with MPEP 609.04(a), that the year of publication, 2015, is sufficiently earlier than the effective U.S. filing date, so that the particular month of publication is not an issue.).

Chamorro et al., "Turbulence effects on a full-scale 2.5 MW horizontal-axis wind turbine under neutrally stratified conditions", Wind Energy, vol. 18, No. 2, Feb. 2015, pp. 339-349.

Dasari et al., "Near-wake behaviour of a utility-scale wind turbine", Journal of Fluid Mechanics, Jan. 2019, pp. 204-246.

Emeis et al., "Wind Regimes", Wind Energy Meteorology, Chapter 2, Mar. 2018, pp. 11-30.

Englberger et al., "Does the rotational direction of a wind turbine impact the wake in a stably stratified atmospheric boundary layer?", Wind Energy Science Discussions, Aug. 7, 2019, 24 pp.

Gadde et al., "Effect of Coriolis force on a wind farm wake", Journal of Physics: Conference Series, vol. 1256, No. 1, Jul. 2019, 11 pp.

Gao et al., "Effect of wind veer on wind turbine power generation", Physics of Fluids, vol. 33, No. 1, Jan. 4, 2021, 11 pp.

Gao et al., "Effects of inflow turbulence on structural response of wind turbine blades", Journal of wind engineering and industrial aerodynamics, Apr. 2020, 19 pp.

Gomez et al., "The effect of wind direction shear on turbine performance in a wind farm in central Iowa", Wind Energy Sci, Jan. 2020, pp. 125-139.

Holton et al., "Chapter 8—The planetary boundary layer", Introduction to Dynamic Meteorolgy, 2013, pp. 255-277, (Applicant points out, in accordance with MPEP 609.04(a), that the year of publication, 2013, is sufficiently earlier than the effective U.S. filing date, so that the particular month of publication is not an issue.).

Howland et al., "Influence of atmosphereic conditions on the power production of utility-scale wind turbines in yaw misalignment", Aug. 4, 2020, 37 pp.

Howland et al., "Influence of the horizontal component of Earth's rotation on wind turbine wakes", J Phys. Conf., vol. 1037, No. 7, Jun. 2018, 10 pp.

International Preliminary Report on Patentability from International Application No. PCT/US2022/070356 dated Aug. 10, 2023, 7 pp.

International Search Report and Written Opinion of International Application No. PCT/US2022/070356, dated May 9, 2022, 14 pp.

Lu et al., "Large-eddy simulation of a very large wind farm in a stable atmospheric boundary layer", Physics of Fluids, vol. 23, No. 6, Jun. 2011, 32 pp.

Shu et al., "Investigation of Marine Wind Veer Characteristics Using Wind Lidar Measurements", Atmosphere, vol. 11, Oct. 31, 2020, 14 pp.

Tian et al., "Effects of incoming surface wind conditions on the wake characteristics and dynamic wind loads acting on a wind turbine model", Physics of Fluids, vol. 26, No. 12, Dec. 2014, 20 pp.

Tian et al., "Numerical investigations into the idealized diurnal cycle of atmospheric boundary layer and its impact on wind turbine's power performance", Renewable Energy, vol. 145, Jan. 2020, pp. 419-427.

Toloui et al., "Measurement of atmospheric boundary layer based on super-large-scale particle image velocimetry using natural snowfall", Experiments in fluids, vol. 55, No. 1737, May 10, 2014, 14 pp.

Van Der Laan et al., "Why the Coriolis force turns a wind farm wake clockwise in the Northern Hemisphere", Wind Energy Science, vol. 2, No. 1, May 29, 2017, pp. 285-294.

Verhulst et al., "Large eddy simulation study of the kinetic energy entrainment by energetic turbulent flow structures in large wind farms", Physics of Fluids, vol. 26, No. 2, Feb. 2014, 8 pp.

Wagner et al., "Simulation of shear and turbulence impact on wind turbine performance", National Laboratory for Sustainable Energy, Jan. 2010, 55 pp.

Walter et al., "Speed and direction shear in the stable nocturnal boundary layer", J. Sol. Energy Eng., vol. 131, No. 1, Feb. 2009, 7 pp.

Yoshiaki et al., "Effects of turbulence, wind shear, wind veer, and atmospheric stability on power performance: a case study in Brazil", EWEA Annual Event, 2015, 6 pp., (Applicant points out, in accordance with MPEP 609.04(a), that the year of publication, 2015, is sufficiently earlier than the effective U.S. filing date, so that the particular month of publication is not an issue.).

* cited by examiner

| $\bar{U}_{hub} = 6$ m/s | | | | | $\bar{U}_{hub} = 7$ m/s | | | | |
|---|---|---|---|---|---|---|---|---|---|
| YB [°] | $\gamma_U$ [°/m] | | | | YB [°] | $\gamma_U$ [°/m] | | | |
| | 0.1 | 0.2 | 0.3 | 0.4 | | 0.1 | 0.2 | 0.3 | 0.4 |
| $\gamma_L$ [°/m] 0.1 | 1 | 1 | 2 | 2 | $\gamma_L$ [°/m] 0.1 | 1 | 1 | 2 | 3 |
| 0.2 | 1 | 1 | 2 | 2 | 0.2 | 1 | 2 | 2 | 3 |
| 0.3 | 1 | 2 | 2 | 2 | 0.3 | 2 | 2 | 3 | 3 |
| 0.4 | 1 | 2 | 2 | 2 | 0.4 | 3 | 3 | 3 | 3 |

| $\bar{U}_{hub} = 8$ m/s | | | | | $\bar{U}_{hub} = 9$ m/s | | | | |
|---|---|---|---|---|---|---|---|---|---|
| YB [°] | $\gamma_U$ [°/m] | | | | YB [°] | $\gamma_U$ [°/m] | | | |
| | 0.1 | 0.2 | 0.3 | 0.4 | | 0.1 | 0.2 | 0.3 | 0.4 |
| $\gamma_L$ [°/m] 0.1 | 2 | 2 | 3 | 4 | $\gamma_L$ [°/m] 0.1 | 2 | 3 | 3 | 4 |
| 0.2 | 2 | 2 | 3 | 4 | 0.2 | 2 | 2 | 3 | 4 |
| 0.3 | 3 | 3 | 3 | 4 | 0.3 | 3 | 3 | 4 | 4 |
| 0.4 | 3 | 3 | 3 | 4 | 0.4 | 3 | 3 | 4 | 4 |

| $\bar{U}_{hub} = 10$ m/s | | | | | $\bar{U}_{hub} = 11$ m/s | | | | |
|---|---|---|---|---|---|---|---|---|---|
| YB [°] | $\gamma_U$ [°/m] | | | | YB [°] | $\gamma_U$ [°/m] | | | |
| | 0.1 | 0.2 | 0.3 | 0.4 | | 0.1 | 0.2 | 0.3 | 0.4 |
| $\gamma_L$ [°/m] 0.1 | 2 | 3 | 4 | 4 | $\gamma_L$ [°/m] 0.1 | 2 | 3 | 4 | 4 |
| 0.2 | 2 | 2 | 4 | 4 | 0.2 | 2 | 3 | 4 | 4 |
| 0.3 | 3 | 3 | 4 | 4 | 0.3 | 3 | 3 | 4 | 4 |
| 0.4 | 3 | 3 | 4 | 4 | 0.4 | 3 | 3 | 4 | 4 |

FIG. 5

CONTROLLING WIND TURBINE BASED ON WIND VEER

This application is a national stage entry of International Patent Application No. PCT/US2022/070356, filed Jan. 26, 2022, which claims priority to U.S. Provisional Patent Application 63/199,871, filed Jan. 29, 2021, and entitled, "CONTROLLING WIND TURBINE BASED ON WIND VEER," which is incorporated by reference herein in its entirety.

GOVERNMENT RIGHTS

This invention was made with government support under CBET-454259 awarded by National Science Foundation. The government has certain rights in the invention.

BACKGROUND

Wind veer refers to the wind direction variation with height, primarily due to the Ekman spiral. Wind veer can be categorized as veering wind and backing wind regarding the wind spiral direction. In the Northern Hemisphere, a veering wind turns clockwise (CW), and it is usually associated with warm air advection and dynamic lifting, primarily because a south wind transports more heated air to the north. A backing wind turns counterclockwise (CCW) with height and is usually related to cold air advection and dynamic sinking.

SUMMARY

This disclosure describes techniques that provide technical solutions for increasing wind farm energy generation. In some examples, the techniques include the selection of wind turbine type during the wind farm feasibility phase. The techniques may include control updates during wind turbine operation. In some examples, the techniques are based on the wind veer phenomenon. Wind veer refers to wind direction variation with height, which plays a role in the inflow wind field, especially as wind turbines grow larger and affects the wind turbine power generation.

Additional example techniques of this disclosure use the wind direction measurements at different heights to evaluate wind veer conditions for an upper rotor and a lower rotor of a wind turbine. In accordance with an example technique of this disclosure, wind veer conditions are divided into four categories: VV (upper rotor: veering wind; lower rotor: veering wind), VB (upper rotor: veering wind; lower rotor: backing wind), BV (upper rotor: backing wind; lower rotor: veering wind) and BB (upper rotor: backing wind; lower rotor: backing wind). A recommended direction of rotation of a rotor of a wind turbine may be determined based on how frequently the wind turbine experiences each of the four scenarios. Furthermore, in accordance with a technique of this disclosure, a computing system may generate control updates that set small yaw biases in the turbine yaw controller under different wind veer categories. The techniques of this disclosure may be adapted to most commercialized megawatt-scale horizontal-axis wind turbines to increase the energy generation and/or prolong operational lifespans of wind turbines. As another result, extra loadings caused by wind veer may be well-controlled with such yaw control updates.

In some examples, a method comprises: determining, by a control system, from among a plurality of categories, a current category of an incoming wind approaching a wind turbine, the plurality of categories including two or more of: a first wind condition in which wind contacting an upper rotor of the wind turbine is veering and wind contacting a lower rotor of the wind turbine is veering, a second wind condition in which the wind contacting the upper rotor of the wind turbine is veering and the wind contacting the lower rotor of the wind turbine is backing, a third wind condition in which the wind contacting the upper rotor of the wind turbine is backing and the wind contacting the lower rotor of the wind turbine is veering, or a fourth wind condition in which the wind contacting the upper rotor of the wind turbine is backing and the wind contacting the lower rotor of the wind turbine is backing; setting, by the control system, a yaw bias of the wind turbine based on the current category.

In some examples, a control system comprises processing circuitry configured to: determine, from among a plurality of categories, a current category of an incoming wind approaching a wind turbine, the plurality of categories including two or more of: a first wind condition in which wind contacting an upper rotor of the wind turbine is veering and wind contacting a lower rotor of the wind turbine is veering, a second wind condition in which the wind contacting the upper rotor of the wind turbine is veering and the wind contacting the lower rotor of the wind turbine is backing, a third wind condition in which the wind contacting the upper rotor of the wind turbine is backing and the wind contacting the lower rotor of the wind turbine is veering, or a fourth wind condition in which the wind contacting the upper rotor of the wind turbine is backing and the wind contacting the lower rotor of the wind turbine is backing; set a yaw bias of the wind turbine based on the current category.

In some examples, a wind turbine comprising: an upper rotor configured to at least partially rotate to attain a yaw bias based on a setting that a control system determines based on a current category of an incoming wind approaching the wind turbine; and a lower rotor configured to at least partially rotate to attain the yaw bias, wherein the control system determines, from among a plurality of categories, the current category, the plurality of categories including two or more of: a first wind condition in which wind contacting an upper rotor of the wind turbine is veering and wind contacting a lower rotor of the wind turbine is veering, a second wind condition in which the wind contacting the upper rotor of the wind turbine is veering and the wind contacting the lower rotor of the wind turbine is backing, a third wind condition in which the wind contacting the upper rotor of the wind turbine is backing and the wind contacting the lower rotor of the wind turbine is veering, or a fourth wind condition in which the wind contacting the upper rotor of the wind turbine is backing and the wind contacting the lower rotor of the wind turbine is backing.

In some examples, a computer-readable data storage medium has instructions stored thereon that, when executed by processing circuitry of a control system, cause the processing circuitry to: determine, from among a plurality of categories, a current category of an incoming wind approaching a wind turbine, the plurality of categories including two or more of: a first wind condition in which wind contacting an upper rotor of the wind turbine is veering and wind contacting a lower rotor of the wind turbine is veering, a second wind condition in which the wind contacting the upper rotor of the wind turbine is veering and the wind contacting the lower rotor of the wind turbine is backing, a third wind condition in which the wind contacting the upper rotor of the wind turbine is backing and the wind contacting the lower rotor of the wind turbine is veering, or a fourth wind condition in which the wind contacting the upper rotor of the wind turbine is backing and the wind contacting the lower rotor of the wind turbine is backing; set a yaw bias of the wind turbine based on the current category.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

The details of one or more examples of this disclosure are set forth in the accompanying drawings and the description below. Other features, objects, and advantages of this disclosure will be apparent from the description and drawings, and from the claims.

FIG. 5 is a set of tables for example yaw-bias settings under various inflow conditions in accordance with techniques of this disclosure.

DETAILED DESCRIPTION

Wind turbines are a growing part of the world's system for generating electricity. Generation of electricity from wind turbines is one of the leading ways of reducing the emission of greenhouse gases. Accordingly, increasing the power output of wind turbines and prolonging the usable lifespans of wind turbines is of great importance.

Figure 1:
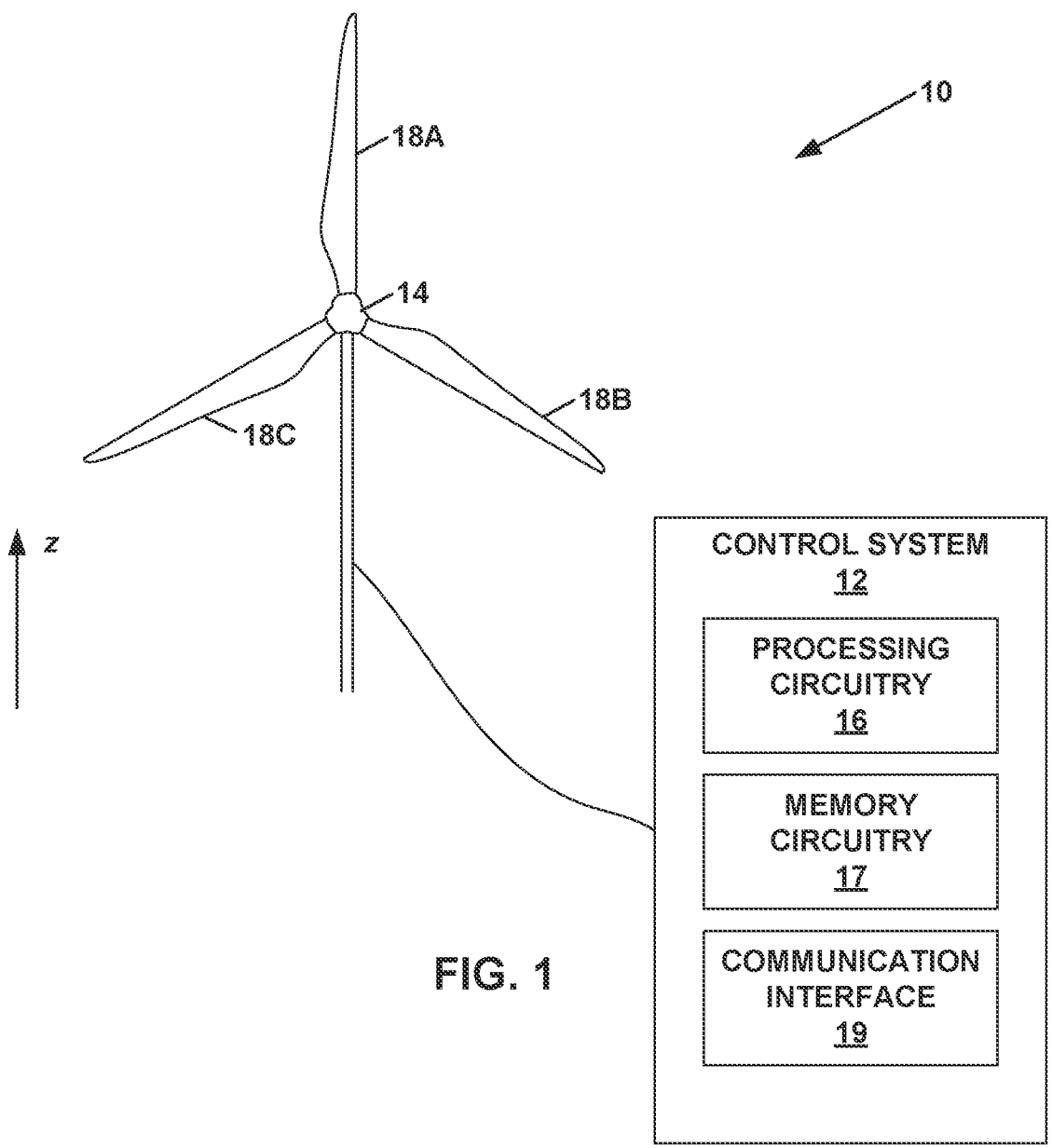
FIG. 1 is a conceptual diagram showing an example system comprising a control system in accordance with techniques of this disclosure.

FIG. 1 is a conceptual diagram showing an example system 10 comprising a control system 12 in accordance with one or more techniques of this disclosure. Control system 12 may provide real-time control of a wind turbine 14 to increase power output for wind turbine 14. Control system 12 may be included in wind turbine 14 or separate from wind turbine 14. As shown in FIG. 1, control system 12 may include processing circuitry 16 configured to implement functionality and/or execute instructions associated with techniques of this disclosure. In some examples, control system 12 may include memory circuitry 17 and a communication interface 19. As further shown in FIG. 1, wind turbine 14 includes upper and lower rotors, such as rotors 18A-18C (collectively, "rotors 18"). Each of rotors 18 may represent an airfoil or rotor blade of wind turbine 14. In the example of FIG. 1, rotor 18A is an upper rotor, and rotors 18B, 18C are lower rotors. It is noted that due to the fact that rotors 18 are configured to rotate, any of rotors 18 can be an upper rotor or a lower rotor depending on the angular positions of rotors 18 (which, in general, are changing during operation of wind turbine 14). Wind turbine 14 may include one or more actuators configured to apply a torque to rotate at least part of one or more of rotors 18 (and therefore the upper rotor or lower rotor).

Although the techniques of this disclosure are primarily described herein with respect to one wind turbine (e.g., wind turbine 14), a person of ordinary skill should understand that the techniques may be applied to control any number of wind turbines, such as two or more wind turbines. Accordingly, examples in which control system 12 is configured to provide real-time control of a plurality of wind turbines to increase power output for the wind turbines are contemplated by this disclosure. Furthermore, while wind turbine 14 is shown in FIG. 1 as including three rotors, a person of ordinary skill should understand that the techniques may be applied to a wind turbine including any number of rotors, such as two, four, etc.

The wind approaching wind turbine 14 (i.e., the incoming wind) may change direction with height. For instance, the direction that the incoming wind approaches wind turbine 14 may change in a clockwise direction with greater height. This is referred to as a veering wind in the Northern Hemisphere. In some instances, the direction that the incoming wind approaches wind turbine 14 may change in a counterclockwise direction with greater height. This is referred to as a backing wind in the Northern Hemisphere. Moreover, in some instances, the direction that the incoming wind approaches a lower rotor (e.g., rotor 18B or rotor 18C) of wind turbine 14 may change in a clockwise direction with greater height but the incoming wind that approaches an upper rotor (e.g., rotor 18A) of wind turbine 14 may change in a counterclockwise direction with greater height. Similarly, the direction that the incoming wind approaches a lower rotor of wind turbine 14 may change in a counterclockwise direction with greater height but the incoming wind that approaches an upper rotor of the same wind turbine may change in a clockwise direction with greater height.

Thus, as described herein, the incoming wind approaching wind turbine 14 may be classified as belonging to one of four categories, which are denoted VV, VB, BV, and BB:

VV (upper rotor: veering wind; lower rotor: veering wind),
VB (upper rotor: veering wind; lower rotor: backing wind),
BV (upper rotor: backing wind; lower rotor: veering wind), and
BB (upper rotor: backing wind; lower rotor: backing wind)

The category of the incoming wind approaching wind turbine 14 may change over time as natural atmospheric conditions change. For example, the category of the incoming wind approaching wind turbine 14 may change from VV or VB or BV or BB.

The category of the incoming wind approaching wind turbine 14 may influence the power generated by wind turbine 14. For instance, an incoming wind in the VV and VB categories may reduce power generation in a clockwise rotating wind in the Northern Hemisphere. An incoming wind in the BV and BB categories may increase power generation in a clockwise rotating wind turbine in the Northern Hemisphere.

The change in power generation attributable to veering and backing winds may be dependent on the direction of rotation of the rotors of wind turbine 14. For instance, a wind turbine in the Northern Hemisphere that commonly experiences BB and BV winds may generate more power if the rotors of wind turbine 14 rotate in a clockwise direction. Conversely, a wind turbine in the Northern Hemisphere that commonly experiences VB and VV winds may generate more power if the rotors of wind turbine 14 rotate in a counterclockwise direction. Accordingly, the categories of wind at a site of a planned wind turbine may be measured over a period of time (e.g., 1.0 year). Based on these measurements, a computing system, such as control system 12, may determine whether it would be more beneficial for the planned wind turbine to rotate in a clockwise direction or a counterclockwise direction.

Figure 2:
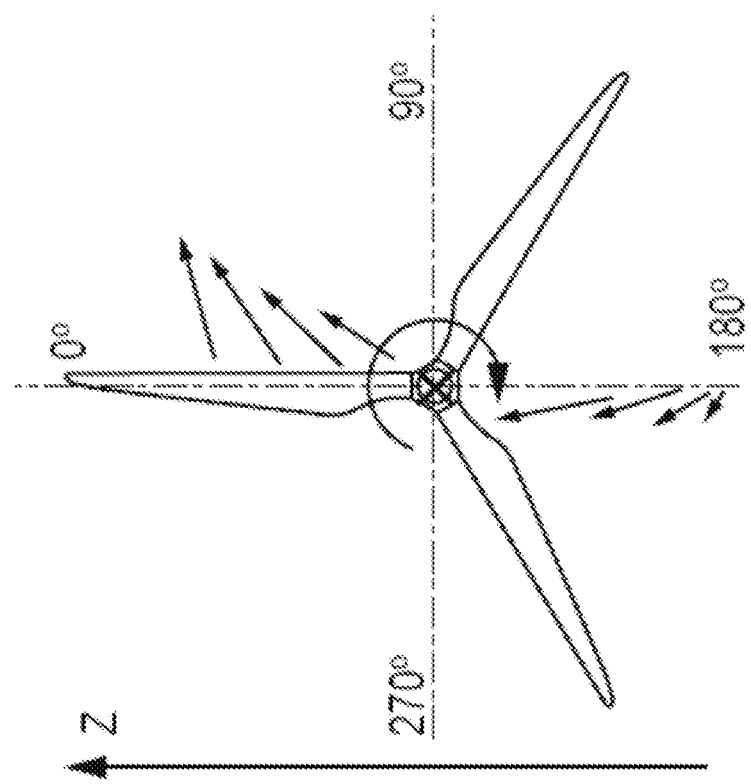
FIG. 2 is a conceptual diagram showing example terms and variables related to this disclosure.
Figure 2:
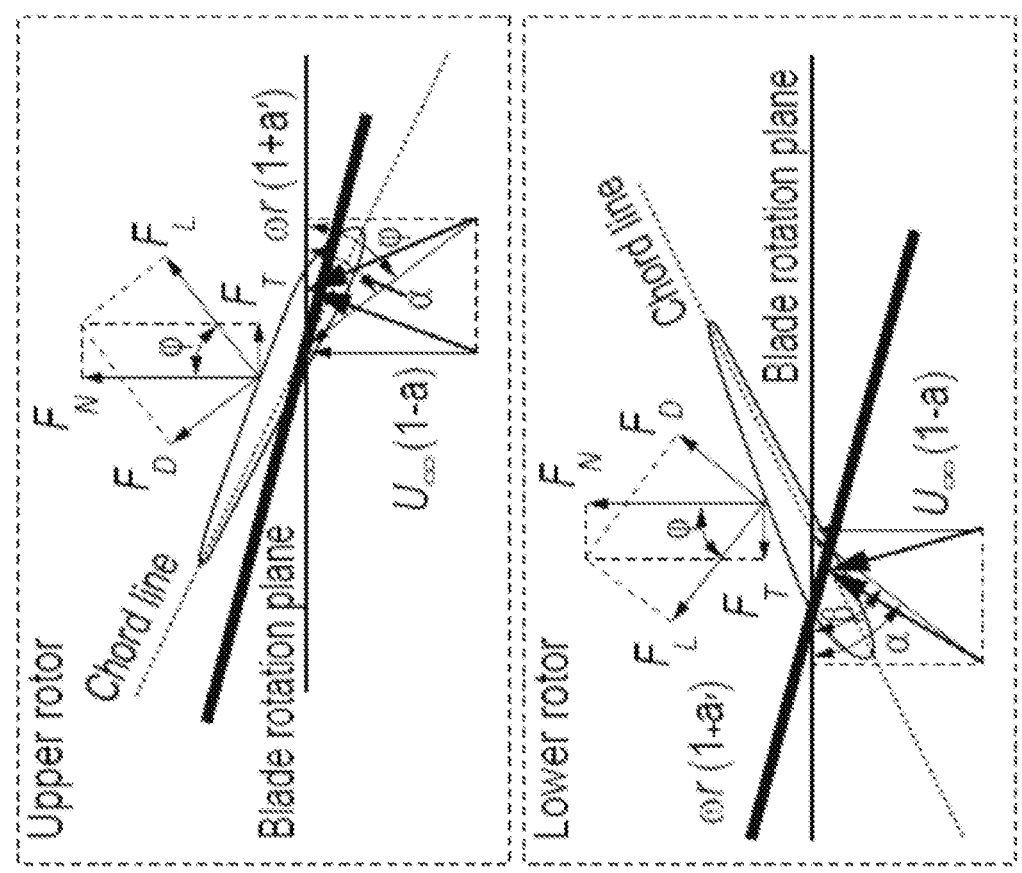

FIG. 2 is a conceptual diagram showing example terms and variables related to this disclosure. As shown in FIG. 2, the direction that incoming wind approaches wind turbine 14 may change in a clockwise direction with greater height (i.e., greater values of z). As further shown in FIG. 2, the upper rotor and lower rotor may include various characteristics. As used herein, a chord line refers to a straight line connecting the leading and trailing edges of a rotor. A blade rotation plane refers to a plane perpendicular to the shaft of wind turbine 14. $U_\infty$ refers to inflow speed. $\omega$ refers to turbine rotor speed. $\beta$ refers to pitch angle. it is assumed that wind veer has a limited effect on $U_\infty$, $\omega$, and $\beta$.

In FIG. 2, it is supposed that the inflow wind at hub height ($U_{rel}$) comes from the south (i.e., 180°, points inside). From the hub to the blade top tip (upper rotor), the inflow wind shifts counterclockwise as height increases, i.e., backing wind. From the blade bottom tip to the hub (lower rotor), the inflow wind moves clockwise with height, i.e., veering wind. In the velocity triangle, the relative velocity ($U_{rel}$) consists of the inflow component, i.e., $U_\infty(1-a)$, and rotational component, i.e., $\omega_r(1+a')$, where a and a' are the axial and angular induction factors, respectively. In the upper rotor, the backing wind leads to a decrease in the inflow angle ($\varphi$). As $\varphi$ decreases, the angle of attack ($\alpha$) decreases, while relative velocity ($U_{rel}$) increases. In the lower rotor, the veering wind results in an increment in $\varphi$, and thus, the corresponding $\alpha$ increases and $U_{rel}$ decreases.

Wind direction variation with height (i.e., wind veer) is discussed in the following. Wind veer plays a role in the inflow wind field as the wind turbine enlarges. The wind veer characteristics and their impact on turbine performance were explored using a 5-year field dataset measured at the Eolos Wind Energy Research Station of the University of Minnesota. The dataset indicated that wind veer exhibits an appreciable diurnal variation in that veering and backing winds tend to occur during nighttime and daytime, respectively.

Dividing the wind veer conditions into four scenarios based on their changes in turbine upper and lower rotors that influence the loading on different rotor sections (e.g., VV, VB, BV, and BB) is proposed. Such a division may better elucidate the impact of wind veer on turbine power generation. For instance, clockwise-rotating turbines tend to yield substantial power losses in scenarios VV and VB and small power gains in scenarios BV and BB. Counterclockwise-rotating turbines follow exactly opposite trends to the clockwise-rotating turbines. These findings may be generalizable to other wind sites for power evaluation and provide insights into the turbine type selections targeting the maximum profits.

As used herein, wind veer refers to the wind direction variation with height in the community of meteorology, primarily due to the Ekman spiral related to the balance on Coriolis force, pressure gradient force and friction, advection turning associated with thermal wind, and inertial oscillation. Wind veer can be categorized as veering wind and backing wind regarding the wind spiral direction. In the Northern Hemisphere, the veering wind turns clockwise (CW), and it is usually associated with warm air advection and dynamic lifting, primarily because a south wind transports more heated air to the north. The backing wind turns counterclockwise (CCW) with height and is usually related to cold air advection and dynamic sinking. In recent years, the wind veer effect is becoming an increasingly significant issue in the community of wind energy as wind turbines continue to grow in size. For instance, Haliade-X 12 MW, an offshore turbine, reaches 370 meters (m) with a hub height of H=260 m and a rotor diameter of D=220 m, and prototypes of even larger, more powerful offshore turbines are presently being developed. Additionally, onshore wind turbine may reach 250 m with a site-specific hub height up to H=165 m and a rotor diameter of D=170 m. Such heights are far above the surface layer, which is below about 100 m, associated with strong vertical wind shear and fall into the range of Ekman layers with substantial changes in wind directions due to the Ekman spiral effect as a consequence of the Coriolis force. Therefore, a better understanding of how wind turbines/wind farms behave under wind veer conditions is highly needed for turbine maximization.

Because the wind veer effect is a phenomenon of atmospheric boundary layer flows, the wind veer effect was not fully considered in most previous simulation investigations and wind tunnel studies on the wind farm flows. There are only a few state-of-the-art literature studies that extensively discuss the turbine related wind veer effect, which can be summarized into three aspects: wind veer characteristics and their impacts on turbine power production and turbine wake deflection. Wind veer may present appreciable differences between diurnal and nocturnal periods or seasons. For example, K. Walter, C. C. Weiss, A. H. P. Swift, J. Chapman, and N. D. Kelley, "Speed and direction shear in the stable nocturnal boundary layer," J. Sol. Energy Eng. 131, 0110131 (2009) (hereinafter, "Walter et al.") characterized the wind veer over a span from 10 m to 116 m using a 7523-h (313-day) dataset measured by a meteorological tower ("met tower") located in Texas. USA. Walter et al. found that the wind veer follows a daily cycle and that the stable nighttime conditions permit a higher probability of high magnitude veering wind. Similar trends were also extracted by M. Abkar, A. Sharifi, and F. Porte-Agel, "Wake flow in a wind farm during a diurnal cycle," J. Turbul. 17, 420 (2016) (hereinafter, "Abkar et al.") for turbines (i.e., Vestas V80-2 MW, H=70 m and D=80 m) under onshore atmospheric boundary layer conditions using large-eddy simulations (LESs) combined with the actuator-disk model for turbines. Abkar et al. reported that wind veer is more substantial (0.10°/m–0.25°/m) at the nocturnal time associated with a stable atmosphere, while weaker wind veer tends to occur at daytime (<0.02°/m) with convective flows. Regarding offshore sites, N. Bodini, J. K. Lundquist, and A. Kirincich, "U.S. East coast lidar measurements show offshore wind turbines will encounter very low atmospheric turbulence." Geophys. Res. Lett. 46, 5582, https://doi.org/10.1029/2019gl082636 (2019) (hereinafter, "Bodini et al.") investigated the atmospheric boundary layer over the span of a turbine rotor (i.e., Siemens Gamesa 7.0 MW, D=154 m) based on a 13-month LiDAR measurement deployed on a platform off the Massachusetts coast. USA. Bodini et al. reported that wind veer is much stronger in summer (0.10°/m, winter: 0.05°/m) when the wind flows from land, similar to the stable nighttime conditions found onshore. Such annual variations of wind veer in onshore sites are still unclear, which may significantly differ from the offshore observations due to the different atmospheric conditions, such as higher turbulence dissipation.

With a better understanding of the wind veer characteristics, several field studies were conducted to investigate the wind veer effect on wind turbine power performance. L. M. Bardal, L. R. Satran, and E. Wangsness, Performance Test of a 3 MW Wind Turbine—Effects of Shear and Turbulence (Elsevier, 2015) (hereinafter, "Bardal et al.") conducted a ten-month LiDAR measurement for 3 MW turbines on the coast of Mid-Norway and found that the wind veer may have a small effect on the overall turbine power performance. However, high veer conditions may be associated with appreciable power reduction. Bardal et al. also found that the power coefficient ($C_P$) decreases with inflow wind speeds ranging from about 6 m/s to about 11 m/s (which is below the rated speed). However, an opposite trend that $C_P$ increases below the rated wind speed and decreases above the rated speed was reported by Y. Sakagami, P. A. Santos, J. C. P. Reinaldo and F. F. Taves, in EWEA Annual Event, 2015 (hereinafter, "Sakagami and Taves et al.") based on a six-month field measurement for 0.9 MW turbines (D=44 m and H=55 m) located on the northeast coast of Brazil. Such conflicting statements are suggested to be associated with different locations, data acquisition time, and diverse analysis methods. In addition to the studies using the absolute value of wind veer, the investigation conducted by M. Sanchez Gomez and J. K. Lundquist, "The effect of wind direction shear on turbine performance in a wind farm in central Iowa," Wind Energy Sci. 5, 125 (2020) (hereinafter, "Gomez and Lundquist") reported the different effects of veering and backing winds on turbine power (1.5 MW, D=82.5 m and H=80 m) using a three-month LiDAR dataset measured at Iowa, USA. Gomez and Lundquist found that the large veering has more significant detrimental effects on the turbine power compared to the small backing winds. Gomez and Lundquist also highlighted that the larger wind veer that occurs during a period of ramping electricity demand (06:00-09:00 local time in the morning) undermines turbine power by more than 10%. The aforementioned findings are valuable to provide insight into the optimization of turbine operations for better power generation. However, those field tests usually last for less than one year due to the lack of well-equipped test facilities or the challenges in the long-term measurements. Conducting long term field measurements may reduce the uncertainties induced by the seasonal differences or influence of annual variability to draw conclusions.

Such field measurements can also provide realistic inflow conditions that can be used for the numerical simulations to investigate the wind veer effect on turbine wake deflection. So far, there is no simulation using realistic inflow conditions. Both simulation works for individual turbines and turbine arrays (or wind farms) are conducted under much-simplified wind veer conditions. M. P. van der Laan and N. N. Sorensen, "Why the Coriolis force turns a wind farm wake clockwise in the Northern Hemisphere," Wind Energy Sci. 2, 285 (2017) (hereinafter, "Van der Laan and Sorensen") simulated a NREL 5 MW turbine (D=126 m and H=90 m) under wind veer conditions and reached a consensus about the wake deflection direction (clockwise in the Northern Hemisphere). The work of Van der Laan and Sorensen proved that the Coriolis force indirectly causes the turbine wake to deflect clockwise because of the presence of wind veer and not because of the local changes in the Coriolis force. A. Englberger, A. Dombrack, and J. Lundquist, "Does the rotational direction of a wind turbine impact the wake in a stably stratified atmospheric boundary layer?," Wind Energy Sci. Discuss. 20, 1 (2019) (hereinafter, "Englberger et al.") simulated a turbine (D=100 m and H=100 m) under wind veer and no veer conditions and found that the rotor rotational direction impacts the wake deflection in the presence of wind veer. If no veer is present, the rotor rotation direction exerts little impact. As for wind turbine arrays, M. F. Howland, A. S. Ghate, and S. K. Lele, "Influence of the horizontal component of Earth's rotation on wind turbine wakes," J. Phys.: Conf. Ser. 1037, 072003 (2018) (hereinafter, "Howland et al.") used a Coriolis force term to introduce the wind veer effect in their simulation and found that veer redistributes Reynolds stresses that may have notable impact on wake recovery. S. N. Gadde and R. J. A. M. Stevens, "Effect of Coriolis force on a wind farm wake," J. Phys.: Conf. Ser. 1256, 012026 (2019) (hereinafter, "Gadde and Stevens") simulated a 30-turbine site (D=100 m and H=100 m) and pointed out that a strong wind veer tends to lead to more pronounced wake deflection and such deflection has a significant impact on the power of wind turbines further downstream.

In summary, the existing field studies lack consistent conclusions in terms of how wind veer affects the turbine power generation. Additionally, the improvement in current simulations significantly relies on the field data to provide realistic wind veer inflow characteristics. Consequently, the present study sought to provide a systematic evaluation of wind veer characteristics, including both daily and annual variations, and their effects on turbine power performance, by leveraging the long-term field database measured at the Eolos Wind Energy Research Station of the University of Minnesota (hereinafter, "Eolos station").

Figures 3A, 3B:
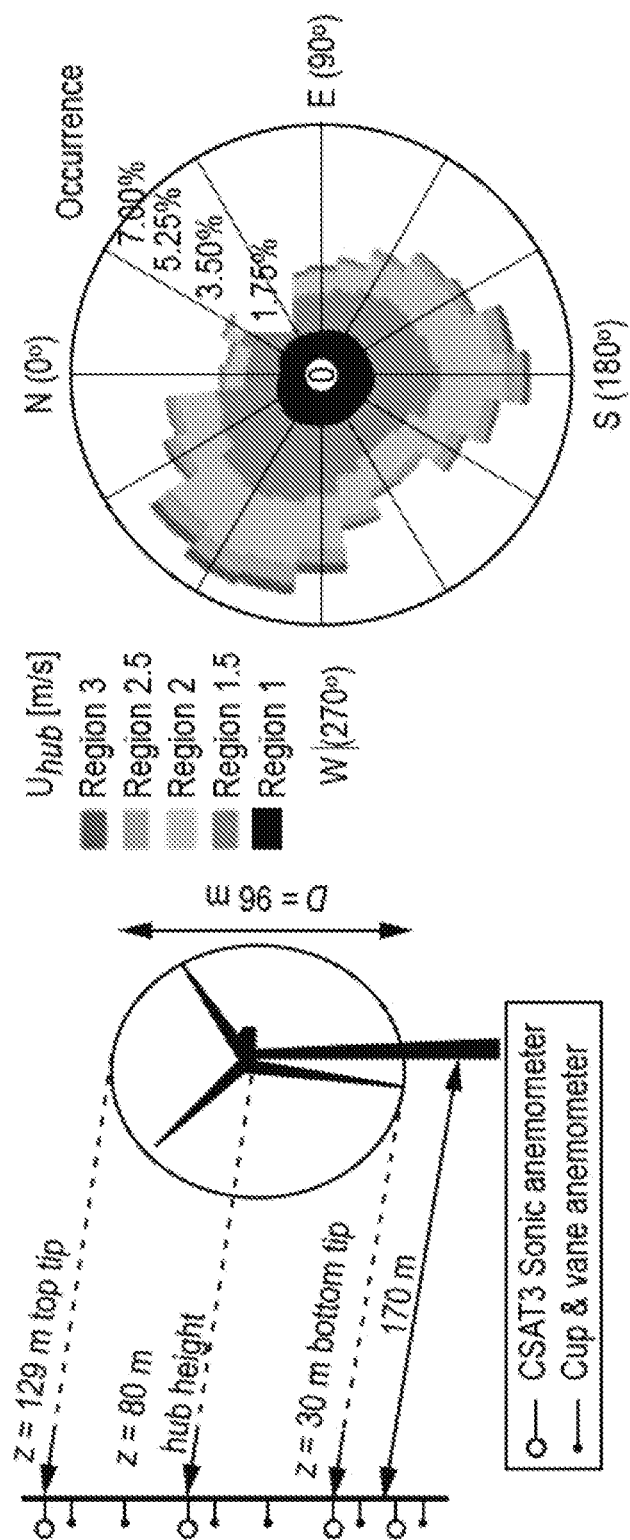
FIG. 3A is a conceptual diagram showing an example wind turbine and meteorological tower.
FIG. 3B is a schematic showing wind occurrences based on measured wind direction and hub-height wind speed.

FIG. 3A is a conceptual diagram showing an example wind turbine and meteorological tower. Specifically. FIG. 3A is a schematic of the Clipper Liberty C96, hereinafter, "Eolos turbine"), a 2.5 MW upwind, three-bladed, horizontal-axis wind turbine, and the meteorological tower at the station used in the investigation described herein. FIG. 3B is a schematic showing wind occurrences based on measured wind direction and hub-height wind speed. A wind rose based on the measured wind direction and wind speed at hub height in the recent five years. The percent level indicates the occurrence of a specific case in a 15° wind direction sector. "N," "E," "S," and "W" stand for the north, east, south, and west directions, respectively.

An investigation into the characteristics of wind veer is discussed in the following. The investigation of the present study utilized the field data collected at the Eolos Station of the University of Minnesota in Rosemount, Minnesota (44° 44'01.4"N, 93° 05'04.4"W). The station is located in a nearly flat terrain with a few sparse roughness elements such as scattered 1 to 2 story buildings and tree patches, whose influence zone is limited to about 6 m above the ground based on our past atmospheric boundary layer measurements. The station consists of the Eolos turbine and a 130 m met tower, as shown in FIG. 3A. The met tower is located 170 m (1.77 D) south of the Eolos turbine, along one of the prevailing wind directions, 180°, as shown in FIG. 3B. The met tower is well-instrumented with velocity (sonic, and cup and vane anemometers), temperature, and relative humidity sensors to characterize the inflow conditions for the turbine. Four high-resolution sonic anemometers (i.e., Campbell Scientific's CSAT3) are mounted at four representative elevations, i.e., rotor top tip (z=129 m), hub height (z=80 m), rotor bottom tip (z=30 m), and standard 10 m. Six cup and vane anemometers (i.e., Met One's 014-A) with a sampling rate of 1 Hz were installed 3 m below each sonic anemometer, i.e., at 126 m, 77 m. 27 m, and 7 m, and at two other elevations. i.e., 102 m and 52 m, corresponding to the midspans of lower and upper blades of the Eolos turbine, respectively. The wind direction measurement accuracy of the sonic anemometers used in the present study is ±0.7° at 1 m/s.

The Eolos turbine belongs to International Electric Commission (IEC) turbine class II with a rotor diameter of D=96 m and a hub height of H=80 m. The cut-in, rated, and cut-out wind speeds are about 4.0 m/s, 11.0 m/s, and 25.0 m/s, respectively. The Eolos turbine operates with various regulation strategies under five regions. Specifically, the Eolos turbine is in control of region 1 ($U_{hub}$<4.0 m/s) with no power generation when the wind speed at hub height ($Uh_{ub}$) is lower than the cut-in wind speed. The Eolos turbine operates in region 3 ($U_{hub}$>11.0 m/s) with variable-pitch regulation when $U_{hub}$ is higher than the rated wind speed. The Eolos turbine is variable speed regulated when $U_{hub}$ is between the cut-in and rated wind speeds, including region 1.5 (4.0 m/s≤$U_{hub}$<6.9 m/s), region 2 (6.9 m/s≤$U_{hub}$<9.2 m/s), and region 2.5 (9.2 m/s≤$U_{hub}$<11.0 m/s). Note that the Eolos turbine possesses the optimal performance with the maximum power coefficient ($C_{p,max}$=0.472) in region 2, and region 1.5 and region 2.5 are transitional regions. As shown in the wind rose in FIG. 3B, the probabilities of occurrence for region 1, region 1.5, region 2, region 2.5, and region 3 are 24%, 39%, 27%, 7%, and 3%, respectively. The standard Supervisory Control and Data Acquisition (SCADA) system simultaneously records all turbine operational conditions at a sampling rate of 1 Hz.

The investigation of the present study utilized a five-year Eolos dataset that consists of inflow wind conditions measured at the met tower and turbine operational conditions recorded in the turbine SCADA system to investigate the wind veer characteristics and their impact on turbine performance. The raw dataset ($DS_i$) with a sampling rate of 1 Hz was preprocessed in the following manner. The raw dataset was first smoothed by averaging consecutive sets of 120 data points (i.e., 2-min arithmetic averages based on 1 Hz raw data) to diminish high-frequency fluctuations associated with small-scale wind structures. To guarantee the met tower measurements represent the inflow conditions for the turbine, the lower and upper bounds (LB, UB) for the hub-height wind directions ($\theta_{hub}$) were set to 90° and 270°, respectively. The corresponding wind direction change ($\Delta\theta$) fell in the range of −180° (lower bound of the wind direction change, $\Delta\theta_{LB}$) to 180° (upper bound of the wind direction change, $\Delta\theta_{UB}$). The remaining wind direction data were used for the calculation of the wind veer across the turbine rotor, i.e., $\gamma=(\theta_{TT}-\theta_{BT})/(z_{TT}-z_{BT})$, where TT and BT are short for the blade top tip and bottom tip, respectively. Other outliers were detected using Grubbs's test (assume following a normal distribution with a detection threshold factor ranging from 0 to 1, where values close to 0 result in a smaller number of outliers and values close to 1 result in a larger number of outliers) and discarded from the dataset with a threshold of 0.05. To have a better linkage between the inflow conditions and the turbine performance, the data with no power generation and affected by the curtailments were discarded by setting a threshold ($P_{thres}$) of 5% for the difference between the power (P) and the power limit ($P_{limit}$). After the applications of the quality control procedures and data clean criteria, there were 361,433 data points remaining (equivalent to 12,048 hours of data) for the following analysis.

Figure 4A:
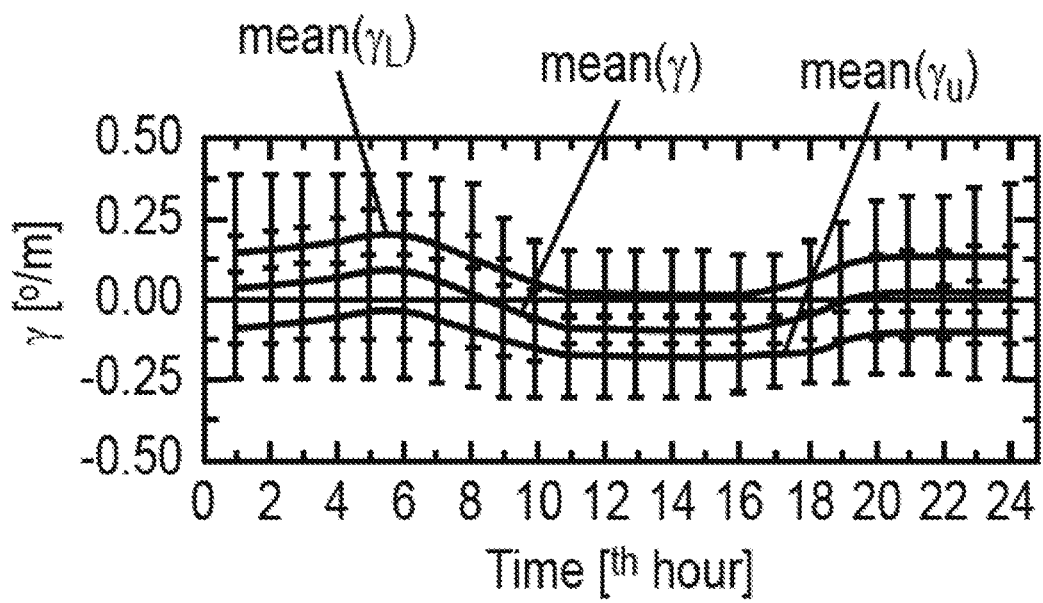
FIG. 4A is a chart showing example wind veer characteristics at particular times of day.
Figure 4B:
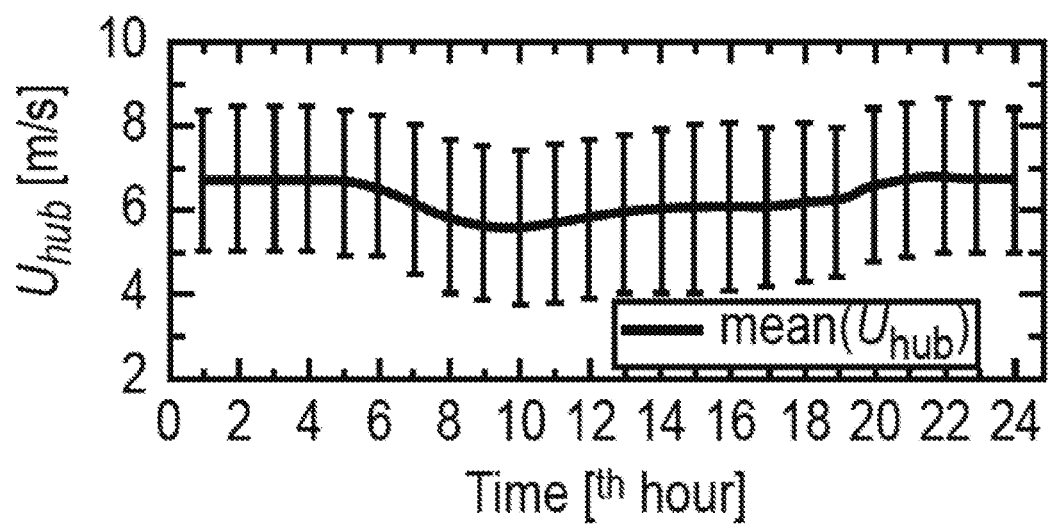
FIG. 4B is a chart showing example hub-height wind speed at particular times of day.

Wind veer characteristics observed from the dataset are discussed in the following. FIG. 4A is a chart showing example wind veer characteristics at particular times of day, and FIG. 4B is a chart showing example hub-height wind speed at particular times of day. To investigate the diurnal variation of wind veer, the observations are portioned based on the hour of the day. As shown in FIG. 4A, the hourly averaged γ monotonously increases from the sunset at about 18:00 to the sunrise at about 6:00, associated with the evolving temperature field that does not reach equilibrium. The hourly averaged γ sharply decreases from about 6:00 to about 10:00 and then exhibits a "plateau" region from about 11:00 to about 17:00, associated with the consistent surface layer. A similar trend of the daily cycle of γ was observed on 1 Aug. 2013 in a wind site in central Iowa. Additionally, the daily variation of γ follows a similar trend to $U_{hub}$ with a correlation of 0.75, as shown in FIG. 4B. However, the fluctuations of these two variables are negatively correlated with a coefficient of −0.88, suggesting that the limited changes in γ during the daytime may be related to the high turbulence levels at that time. Note that the turbulence level is considered an independent variable in the above correlation analysis. Note that the error bars correspond to ±1 standard deviation. Note that the time here refers to local time.

The hourly averaged $\gamma_U$ and $\gamma_L$ are well correlated [i.e., $\rho(\gamma_U, \gamma_L)$=0.99] and follow similar trends to γ. The combined effect of $\gamma_U$ and $\gamma_L$ shows the hourly averaged γ tends to be backing in the daytime and veering in the nighttime, his trend matches well the atmospheric stability changes during a day that the Midwest region and Great Plains experience an energetically stable nocturnal and an unstable diurnal boundary layer. The statically stable conditions permit a higher probability of higher magnitude veering winds, which explains the prevailing veering conditions at nighttime in our field observations. Besides, the percent occurrences for the four scenarios are provided for each of the 24 hours in a day in FIG. 4C. The proportions of scenarios VV and BB exhibit significant opposite diurnal variations, while the changes in the other two scenarios are limited. Such ratios may be important for the evaluation of turbine power performance.

Figure 4C:
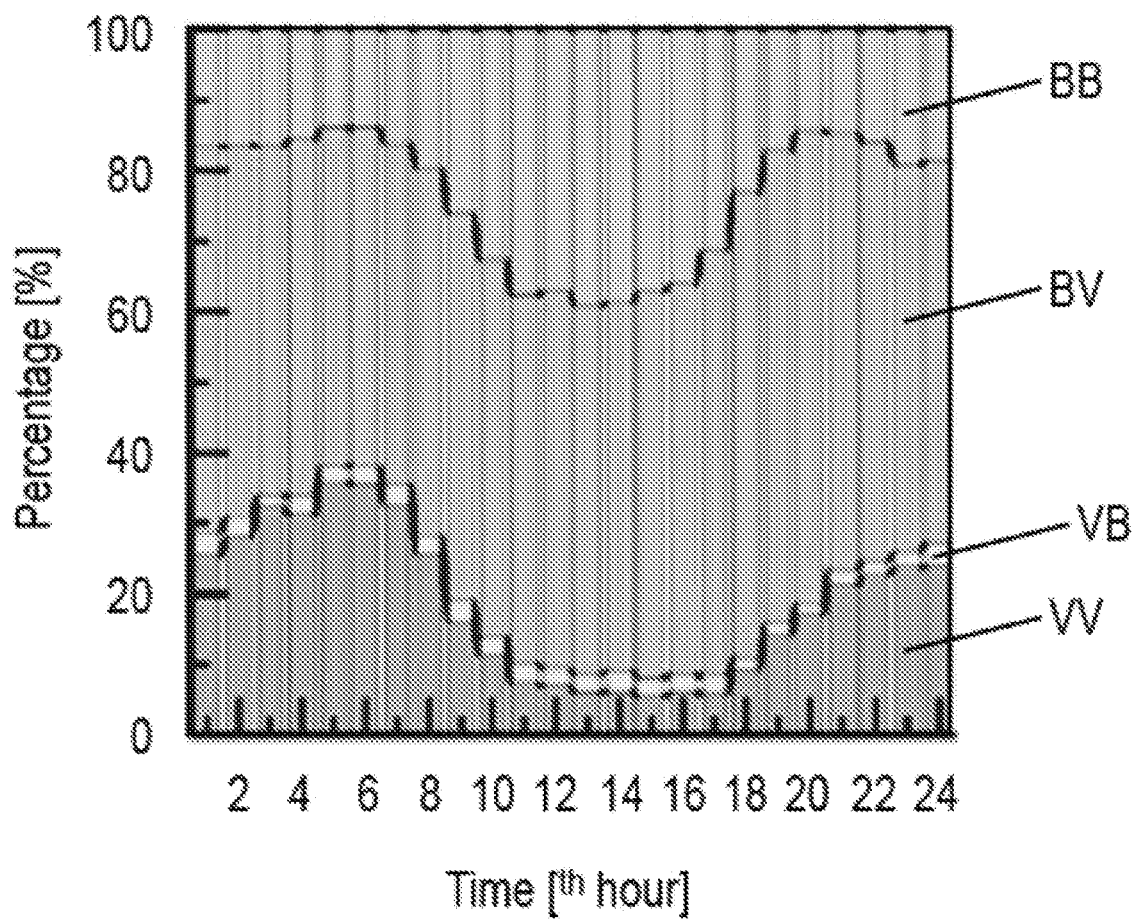
FIG. 4C is a chart showing example percentages of days in which a wind turbine experiences VV, VB, BV, and BB winds at particular times of day.

FIG. 4C is a chart showing example percentages of days in which wind turbine 14 experiences VV, VB, BV, and BB winds at particular times of day. For instance, FIG. 4C shows that on approximately 25% of days, wind turbine 14 experiences VV winds in the first hour of each day. Based on such data, it can be determined whether it is more beneficial for the rotors of wind turbine 14 to rotate clockwise or counterclockwise.

The yaw of wind turbine 14 may be adjusted based on a current category of the incoming wind. Adjusting the yaw of wind turbine 14 may increase the power generated by wind turbine 14 and/or reduce loading on wind turbine 14. Hence, in accordance with a technique of this disclosure, control system 12 for wind turbine 14 may periodically determine a current category of the incoming wind approaching wind turbine 14 and may set a yaw bias of wind turbine 14 based on the current category of the incoming wind. In other words, control system 12 may determine from among a plurality of categories, a current category of an incoming wind approaching wind turbine 14. The plurality of categories may include two or more of the following:

- a first wind condition in which wind contacting an upper rotor of wind turbine 14 is veering and wind contacting a lower rotor of wind turbine 14 is veering;
- a second wind condition in which the wind contacting the upper rotor of wind turbine 14 is veering and the wind contacting the lower rotor of wind turbine 14 is backing;
- a third wind condition in which the wind contacting the upper rotor of wind turbine 14 is backing and the wind contacting the lower rotor of the wind turbine 14 is veering: or
- a fourth wind condition in which the wind contacting the upper rotor of the wind turbine is backing and the wind contacting the lower rotor of wind turbine 14 is backing.

Control system 12 may determine the current category of the incoming wind and set the yaw bias of wind turbine 14 based on the current category. In some examples, and as described in greater detail below, control system 12 may set the yaw bias of wind turbine 14 based on the current category and one or more of an incoming wind speed at a hub height of wind turbine 14, a change in wind direction along the lower rotor of wind turbine 14, or a change in wind direction along the upper rotor of wind turbine 14. In some examples, control system 12 may perform the above operation periodically. e.g., every 5 to 10 minutes. In other words, control system 12 may be configured to periodically determine an updated current category of the incoming wind approaching wind turbine 14, and configured to periodically set the yaw bias of wind turbine 14 based on the updated current category.

Control system 12 may determine the current category of the incoming wind based on measurements from one or more sensors, such as sensors of a separate meteorological tower or based on sensors mounted on wind turbine 14 itself. Such sensors may include light detection and ranging (LiDAR) sensors, anemometers, and/or other types of sensors. In examples where the sensors include LiDAR sensors mounted on wind turbine 14, the LiDAR sensors may include nacelle-mounted LiDAR sensors, spinning hub-mounted LiDAR sensors, and/or ground scanning LiDAR sensors. In general, the sensors may be configured to measure wind magnitude and wind direction.

In some examples, control system 12 may set the yaw bias based on the current category, an incoming wind speed at a hub of wind turbine 14, a change in wind direction along the lower rotor of wind turbine 14, and a change in wind direction along the upper rotor of wind turbine 14. Control system 12 may determine the change in wind direction along the lower rotor of wind turbine 14 as $\gamma_L = (WD_{hub} - WD_{bottom})/(D/2)$ and may determine the change in wind direction along the upper rotor of wind turbine 14 as $\gamma_U = (WD_{top} - WDn_{hub})/(D/2)$, where $WD_{hub}$ indicates a wind direction at the hub height, $WD_{bottom}$ indicates a wind direction at the bottom of the lower rotor, $WD_{top}$ indicates a wind direction at the top of the upper rotor, and D indicates a rotor diameter of the turbine.

For instance, control system 12 may store a separate set of tables for each of the categories. For each of the categories, the set of tables for the category includes tables for different incoming wind speeds at the hub of wind turbine 14. A table for an incoming wind speed at the hub height of wind turbine 14 may specify yaw bias values for different combinations of the change in wind direction along the lower rotor of wind turbine 14 and the change in wind direction along the upper rotor of wind turbine 14. Thus, control system 12 may set the yaw bias of wind turbine 14 to a yaw bias value from one or more sets of tables stored in control system 12.

FIG. 5 is a set of tables for example yaw-bias settings under various inflow conditions. The set of tables shown in FIG. 5 may indicate yaw-bias settings for the VV category. In the set of tables, YB [°] indicates the yaw bias in degrees, $U_{hub}$ indicates the windspeed at the hub, $\gamma_L[°/m]$ indicates the change in wind direction along the lower rotor of wind turbine 14, and $\gamma_U[°/m]$ indicates the change in wind direction along the upper rotor of wind turbine 14. Thus, if the wind speed at the hub is 11 m/s, $\gamma_L[° j/m]$ is 0.4 and $\gamma_U[°/m]$ is 0.3, the yaw bias is 4°. The values provided in the set of tables may be site- and turbine-dependent. In some examples, the maximum yaw bias values should not exceed 5° for the turbines with wind direction and nacelle direction well aligned.

Figure 6A:
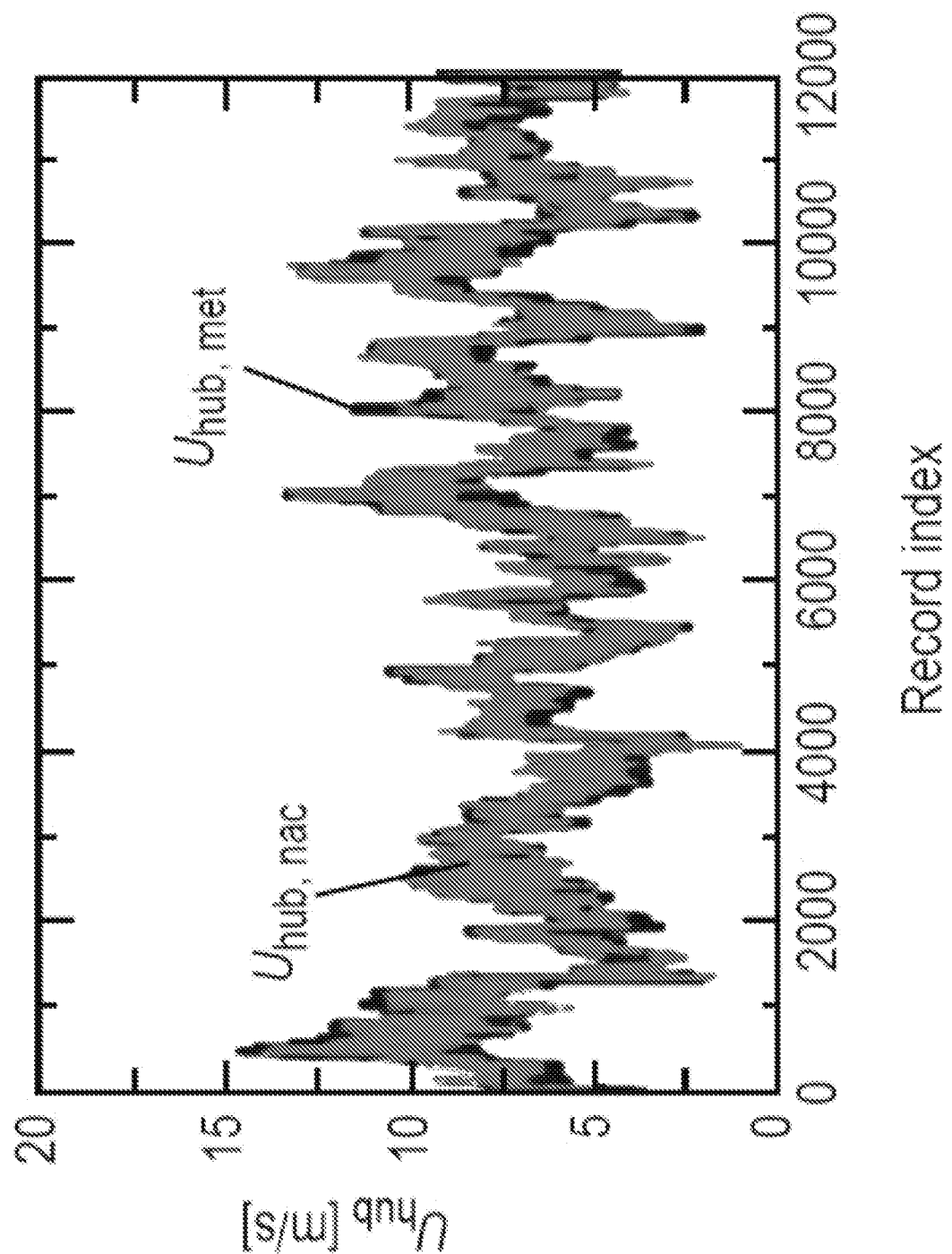
FIGS. 6A-B are charts showing a comparison between hub-height wind speeds measured at a meteorological tower and the turbine nacelle.
Figure 6B:
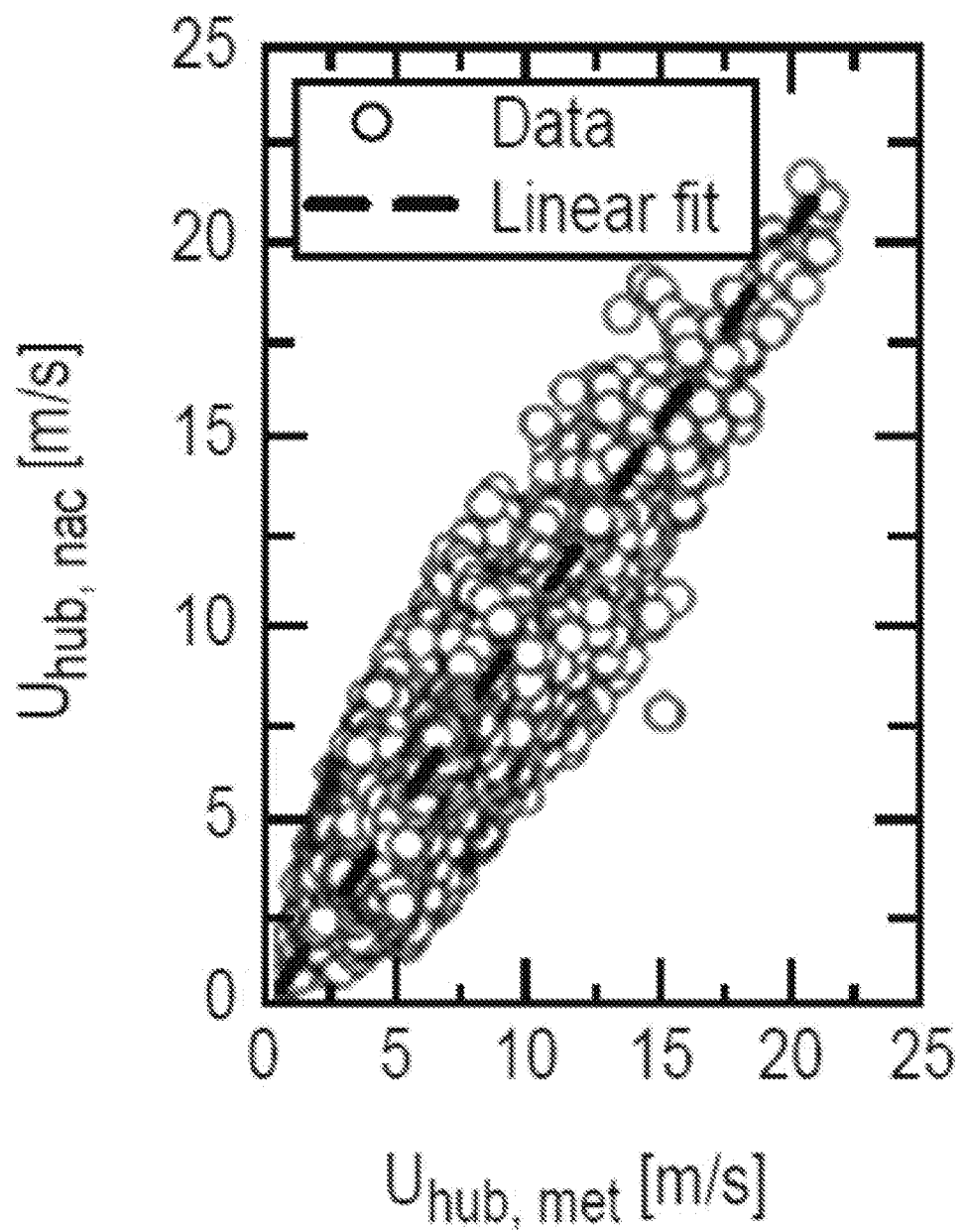

FIGS. 6A-B are charts comparing the hub-height wind speeds measured at the met tower ($U_{hub,met}$) and the turbine nacelle ($U_{hub,nac}$). In particular, FIG. 6A shows a comparison between hub-height wind speeds measured at the met tower ($U_{hub,met}$) and the turbine nacelle ($U_{hub,nac}$), including time series, where the physical time stamp is not continuous due to data preprocessing, and the record index refers to the sequence number of 2-minute averaged data points. FIG. 6B shows a comparison between hub-height wind speeds measured at the met tower ($U_{hub,met}$) and the turbine nacelle ($U_{hub,nac}$), including relevance analysis.

The time variations of $U_{hub,met}$ and $U_{hub,nac}$ have a good agreement in general with a small mean difference of 0.2 m/s, as shown in FIG. 6A. Additionally, the observations of $U_{hub,met}$ and $U_{hub,nac}$ are of high relevance with a linear slope close to 1.0, as shown in FIG. 6B, and a high correlation (Pearson correlation coefficient: $\rho=0.9340$, p-value=0.00), indicating that the inflow conditions are well captured by the measurements at the met tower location.

Figure 7:
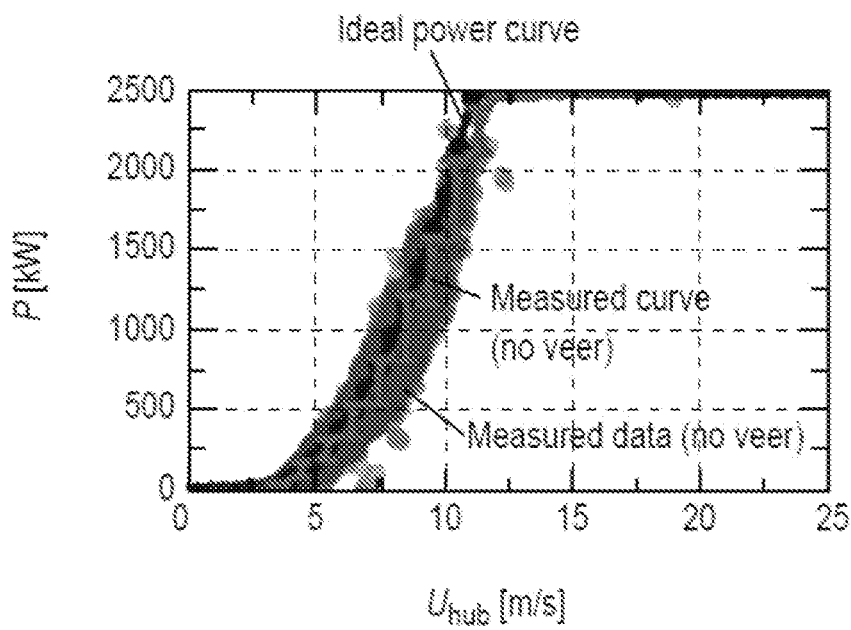
FIG. 7 is a chart showing a measured power curve of an example wind turbine with a bin size of 1.0 m/s under no veer conditions.

FIG. 7 is a chart showing a measured power curve of an example wind turbine (e.g., Eolos turbine) with a bin size of 1.0 m/s under no veer conditions. The error bars shown in FIG. 7 correspond to +1 standard deviation. To determine the power deviation induced by the wind veer effect, the measured power curve under the no veer condition ($\gamma < 0.01°/m$) was extracted from the simultaneously collected data of $U_{hub}$ and power output (P) with a bin size of 1.0 m/s.

No veer conditions represented a proportion of 6% of the entire preprocessed dataset. As shown in FIG. 7, the measured power outputs oscillate around the ideal power curve (i.e., the manufacturer's reference values). The mean measured power curve is below the ideal power curve in most situations, with an overall loss of 12.2%. This measured curve was used as the baseline for the estimation of the power deviation ($\Delta P$) due to wind veer.

Figure 8:
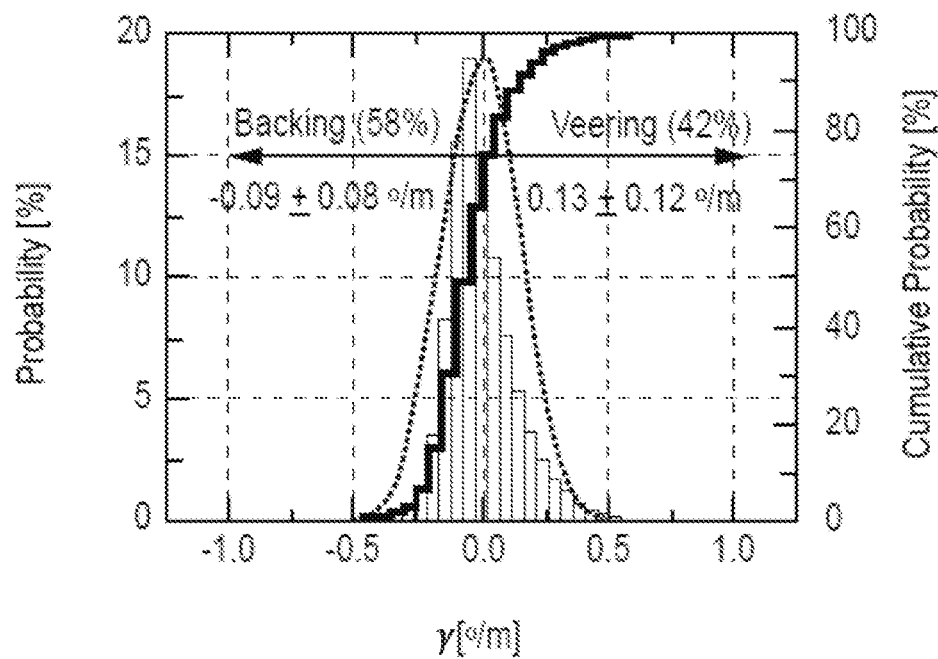
FIG. 8 is a chart showing a probability distribution of wind veer across an example wind turbine rotor.

The wind veer characteristics with the magnitudes of the wind veer across the entire turbine rotor ($\gamma$) were investigated. The results of the investigation are discussed in the following. FIG. 8 is a chart showing a probability distribution of wind veer across an example wind turbine rotor (e.g., Eolos turbine). FIG. 8 is a histogram of the observed percent occurrence of $\gamma$, i.e., 42% for veering (clockwise rotating with height, positive values) and 58% for backing (counterclockwise rotating, negative values). The dashed line/curve of FIG. 8 fits a normal distribution. The solid line/curve of FIG. 8 indicates the cumulative probability of wind veer. Such a ratio is inverse to the offshore observations, mainly associated with the different thermal stratification behaviors in the offshore and onshore sites. The shape of such distribution features a narrow peak at a small negative angle with a broader right tail. It should be noted that although the peak yields at a negative angle, the mean wind veer of the entire dataset is positive (0.002°/m) due to the higher probabilities of higher-magnitude veering winds (see the right tail of the distribution in FIG. 8), consistent with the Ekman spiral effect and inertial oscillation. Such a trend also matches the observations of wind veer measured between 10 m and 116 m levels at Lubbock, Texas.

Figure 9A:
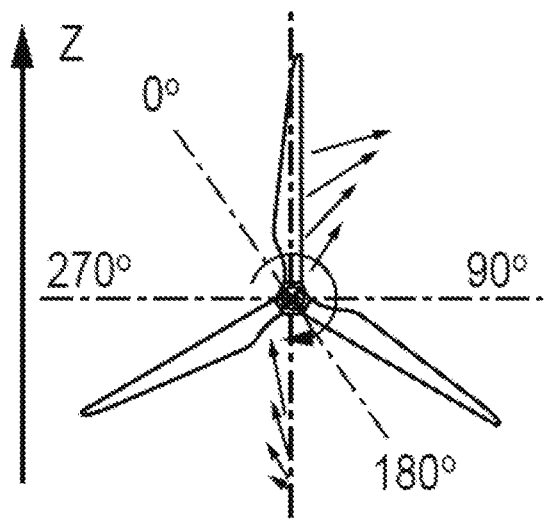
FIGS. 9A-D are conceptual diagrams showing VV, VB, BV, and BB winds.
Figure 9B:
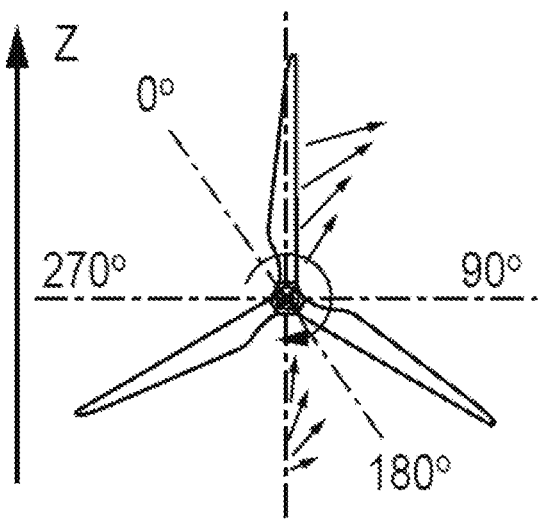
Figure 9C:
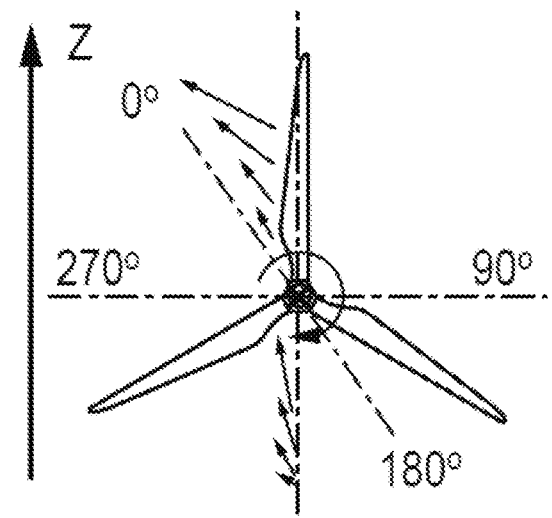
Figure 9D:
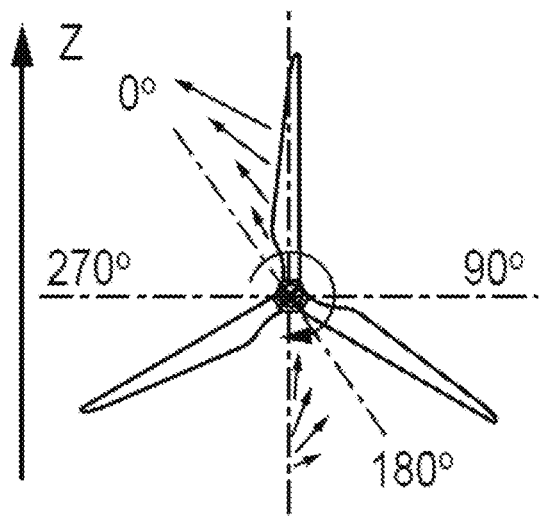
Figure 10B:
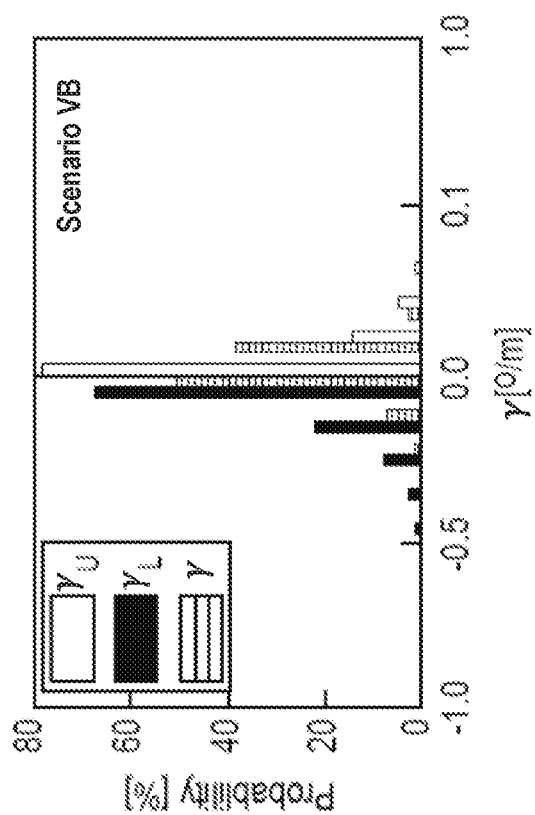
FIGS. 10A-D are charts showing probability distribution for wind veer in VV, VB, BV, and BB winds.
Figure 10A:
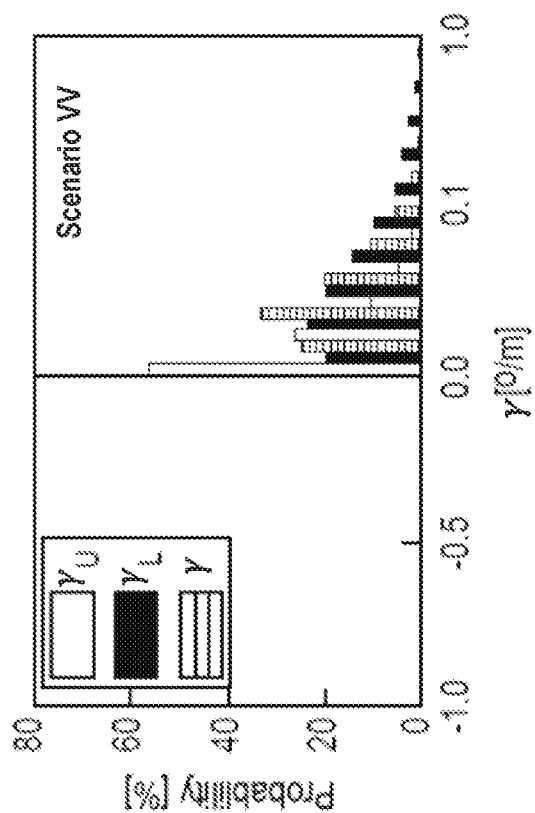
Figure 10C:
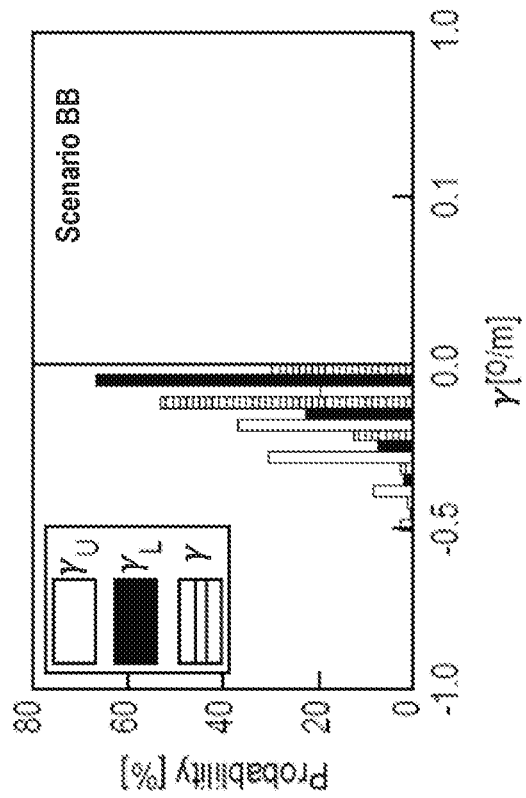
Figure 10D:
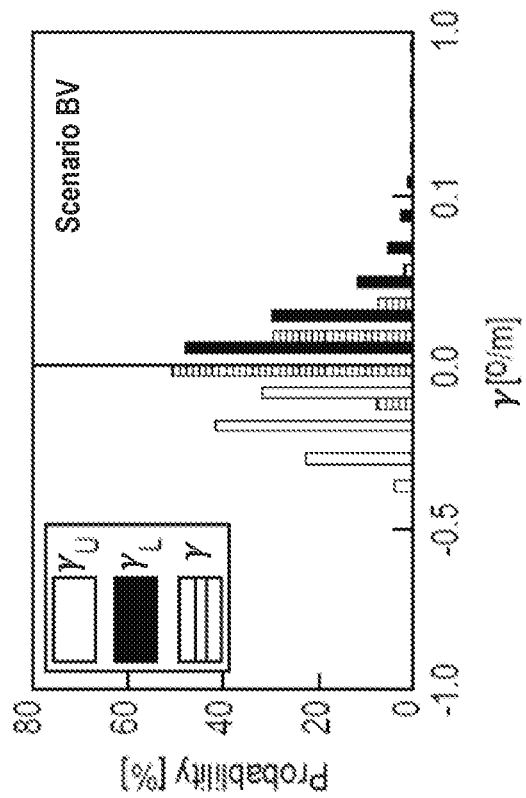

The variation of wind veer across the rotor may significantly affect the forces or loadings acting on the turbine blades. To provide more accurate assessments of the potential effect of wind veer, it is proposed to divide the wind veer conditions into four scenarios based on their changes in upper and lower rotors, as follows:

Scenario VV: veering (upper rotor) and veering (lower rotor), as shown in FIG. 9A.
Scenario VB: veering (upper rotor) and backing (lower rotor); as shown in FIG. 9B.
Scenario BV: backing (upper rotor) and veering (lower rotor); as shown in FIG. 9C.
Scenario BB: backing (upper rotor) and backing (lower rotor); as shown in FIG. 9D.

Scenarios VV, VB, BV, and BB comprise 18%, 2%, 56%, and 24% of the entire dataset, respectively. Such predominant backing winds (BV, BB) are potentially associated with the location of the Eolos station that is in the vicinity of the low-pressure center and the relatively higher unstable atmospheric boundary layer. At this site, the stable, neutral, and unstable conditions comprise 24%, 210, and 55% of a year, respectively, which dramatically differs from the observation at Lubbock, Texas (stable: 52% and unstable: 48%).

FIGS. 9A-D are conceptual diagrams showing VV, VB, BV, and BB winds. In other words, FIGS. 9A-D are schematics illustrating the four scenarios of wind veer conditions: (a) VV, (b) VB, (c) BV, and (d) BB. The green arrow shows the rotational direction of the turbine rotor, i.e., clockwise (CW) for the Eolos turbine. Blue arrows represent wind velocity vectors. For purposes of FIGS. 9A-D, the inflow wind comes from the right south (180°) at hub height, i.e., pointing inside. The dashed-dotted lines point out the vertical, transverse (along W 270° and E 90°), and inflow directions (from S 180° to N 0°). The wind speed increases with height (z), i.e., wind shear. Veering and backing winds shift in clockwise and counterclockwise directions with height, respectively, in the Northern Hemisphere.

FIGS. 10A-D are charts showing probability distribution for wind veer in VV, VB, BV, and BB winds. FIGS. 10A-D further compare the histograms of the wind veer across the turbine rotor ($\gamma$), upper rotor wind veer ($\gamma_U$), and lower rotor wind veer ($\gamma_L$) under the four scenarios. In most situations, the shape of the distributions of $\gamma$, $\gamma_U$, and $\gamma_L$, yields peaks at small magnitudes and low-magnitude angles (<0.3°/m) present over 80% of the time. $\gamma$ is neutralized with the combined effect of $\gamma_U$ and $\gamma_L$, particularly in VB and BV scenarios. More specifically, in VV and VB scenarios, the distributions of) exhibit broader tails compared with their distributions of $\gamma_U$ with almost doubled mean absolute magnitudes. Such phenomena are primarily related to the strong wind shear at lower elevations. Reverse trends are observed in BV and BB scenarios that the distributions of $\gamma_U$ exhibit higher probabilities at relatively high-magnitude angles than the distributions of $\gamma_L$ with higher mean absolute magnitudes, potentially associated with the passage of cold fronts. Additionally, in all four scenarios, the signals of) yield stronger fluctuations than those of $\gamma_U$, mainly due to the higher turbulence levels at lower elevations.

Wind veer induced power deviation is discussed in the following. The effect of wind veer on turbine power production is then evaluated with the field dataset for the four scenarios, followed by a theoretical analysis of the underlying mechanism. In other words, control system 12 may evaluate whether setting the yaw bias of wind turbine 14 based on the current category increased power generation by wind turbine 14. The power deviation coefficient (PDC) is defined as PDC=$(\Sigma \Delta P / \Sigma P_{mod}) \times 100\%$, where $\Delta P = P_{mea} - P_{mod}$, in which $P_{mea}$ and $P_{mod}$ refer to the measured power and modeled power, respectively. $P_{mod}$ is modeled based on the sequence of $U_{hub,nac}$ and the measured power curve under no veer conditions depicted in FIG. 7 with a ninth-order polynomial fit. The negative and positive values of the PDC refer to power loss and power gain, respectively. As listed in Table 1 below, the overall PDC for the entire dataset is very small, indicating that the overall effect of wind veer on the turbine power production is quite limited. However, the PDCs for VV. VB, BV, and BB scenarios are more substantial, suggesting that the underlying mechanism for the wind veer induced power deviation should be analyzed according to different scenarios.

TABLE I

Power deviation under different scenarios based on the field dataset at the Eolos station

| Scenario | Percentage (%) | PDC (%) | Note |
|---|---|---|---|
| VV | 18 | −6.5 | Loss |
| VB | 2 | −4.0 | Loss |
| BV | 56 | 0.2 | Gain |
| BB | 18 | 1.6 | Gain |
| All | 100 | −0.008 | Loss |

Figure 11A:
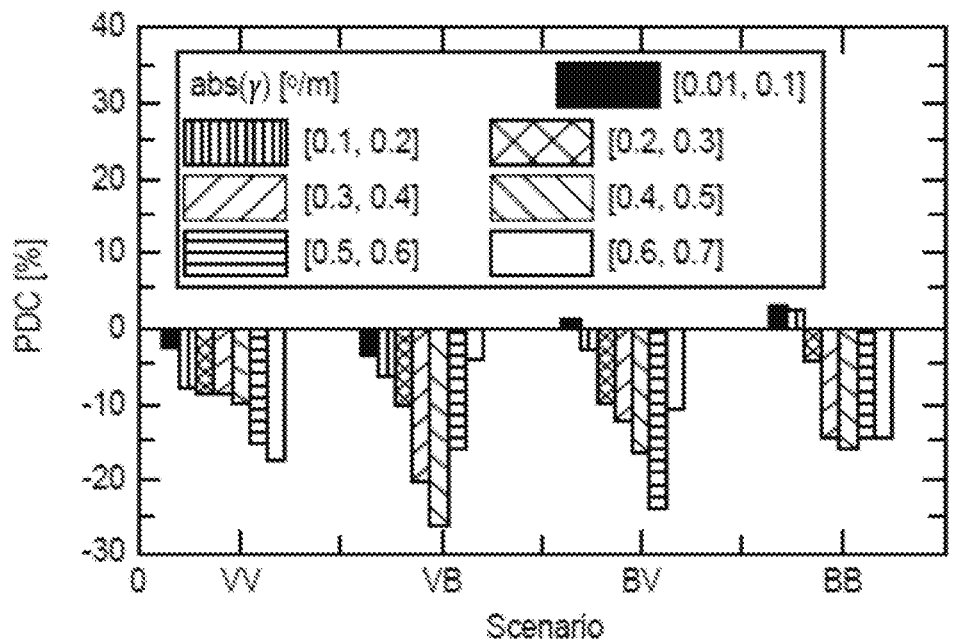
FIG. 11A is a chart showing power deviation coefficients in different ranges of the magnitude of wind veer across an example wind turbine rotor.

FIG. 11A is a chart showing power deviation coefficients in different ranges of the magnitude of wind veer across an example wind turbine rotor FIG. 11A compares the PDCs in different ranges of the magnitude of wind veer across the rotor, i.e., abs($\gamma$). In scenario VV, as the value of abs($\gamma$) increases, the PDC decreases correspondingly. In the range of abs($\gamma$)$\in$[0.6, 0.7](°/m), the PDC declines to −18%, indicating that the larger wind veer tends to result in severe power loss. In scenario VB, the PDC decreases from −4% to −26%, as the value of abs(γ) increases from 0.01°/m to 0.5°/m, and then increases back to −3%, as abs(γ) continuously increases up to 0.7°/m. Such a pattern is also observed in scenario BV, which has a ~2% power gain in the lowest range of [0.01, 0.1] (°/m). In scenario BB, the PDC yields positive values in the lowest two ranges below 0.2°/m and decreases to −15% in higher ranges of abs(γ). It should be noted that the turning points of trends are found at abs(γ) ≈0.5°/m in all four scenarios. However, the data with abs (γ)>0.5°/m are less than 5% of the entire dataset, as shown in FIGS. 10A-D.

Figure 11B:
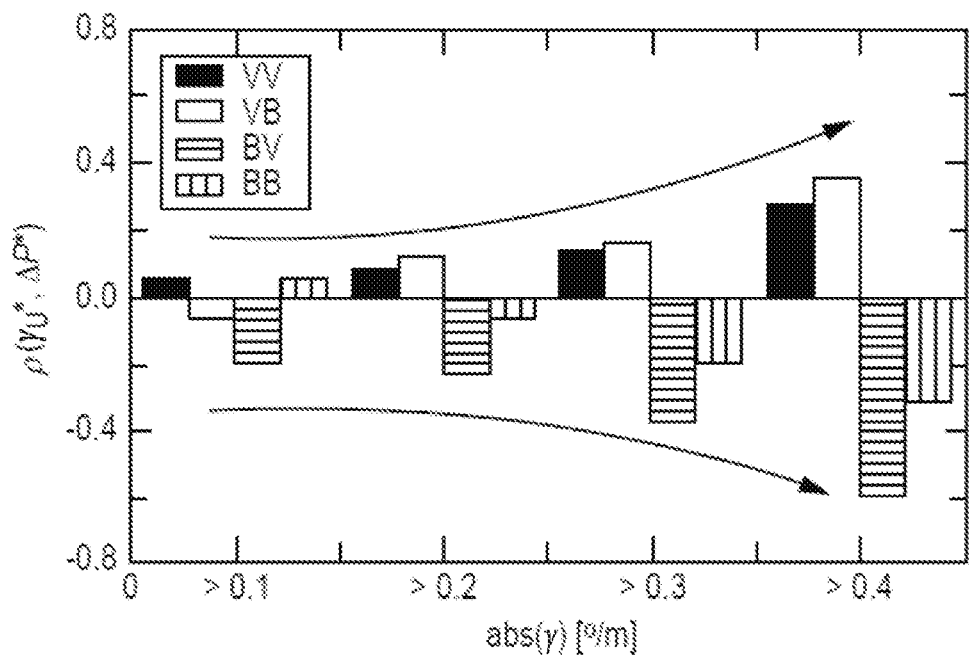
FIG. 11B is a chart showing correlation coefficients of normalized upper-rotor wind veer and power deviations as a function of the magnitude of wind veer across an example wind turbine rotor.

FIG. 11B is a chart showing correlation coefficients of normalized upper-rotor wind veer and power deviations as a function of the magnitude of wind veer across an example wind turbine rotor. FIG. 11B shows the correlation coefficients of normalized upper-rotor wind veer and power deviations denoted $\rho(\gamma_U, \Delta P^*)$, as a function of abs(γ). Note that even the smallest data sample contains sufficient data (240 points) to derive the correlation coefficient. The variables are normalized using the maximum and minimum values in their corresponding datasets. It should be noted that we use $\gamma_U$, instead of γ, for the correlation analysis because $\gamma_U$ is less influenced by the ground and tower shadow effects. All the four scenarios exhibit weak correlations between the two variables $(\gamma_U^*, \Delta P^*)$ using the data satisfying abs(γ)>0.1°/m. Such correlations become much stronger as the sampling condition of abs(γ) increases. When abs(γ)>0.4°/m, $\rho(\gamma_U^*, \Delta P^*)$ for VV, VB, BV, and BB are 0.29, 0.38, −0.59, and −0.30, respectively. This trend implies that the power deviation is more sensitive to high-magnitude veering or backing winds.

To have a better understanding of the findings derived from the field observations, theoretical analysis of the wind veer induced changes in the velocity triangle of a blade element is provided. With renewed attention to FIG. 2, FIG. 2 illustrates the change in the velocity triangle and corresponding turbine loading associated with wind veer using the clockwise-rotating (CW) turbine under the BV scenario as an example. In the analysis, it is assumed that the wind veer has a limited effect on the inflow speed ($U_\infty$), turbine rotor speed (ω), and pitch angle (1%). It is supposed that the inflow wind at hub height ($U_{hub}$) comes from the south (i.e., 180°, points inside). From the hub to the blade top tip (upper rotor), the inflow wind shifts counterclockwise as height increases, i.e., backing wind. From the blade bottom tip to the hub (lower rotor), the inflow wind moves clockwise with height, i.e., veering wind. In the velocity triangle, the relative velocity ($U_{rel}$) consists of the inflow component, i.e., $U_\infty(1-a)$, and rotational component, i.e., $\omega_r(1+a')$, where a and a' are the axial and angular induction factors, respectively. In the upper rotor, the backing wind leads to a decrease in the inflow angle (φ). As φ decreases, the angle of attack (α) decreases, while $U_{rel}$ increases, as shown in FIG. 2. In the lower rotor, the veering wind results in an increment in φ, and thus, the corresponding α increases and $U_{rel}$ decreases.

Wind turbines are designed to operate with the optimal a associated with the maximum lift-to-drag ratio ($C_L/C_D$) for the most aerodynamically efficient operation, i.e., optimal power coefficient $C_{P,opt}$. The changes in α, regardless of increase and decrease, yield a reduction in $C_P$ and, in turn, power output (P∝$C_P$). Additionally, a larger $U_{rel}$ corresponds to a larger lift force acting on the blade element (Fl ∝ U ei), which increases the turbine power output, and vice versa. Note that the above analysis is suitable for the wind turbine operating under variable-speed regulations (i.e., region 1.5, region 2, and region 2.5 in our case). It should be cautioned to extend the analysis to the turbine in operation of variable-pitch regulations (i.e., region 3).

The same analysis for all four scenarios was conducted, and the changes in α and $U_{rel}$ are listed in Table II below.

TABLE II

Theoretical analysis of the power deviation in four scenarios for CW and CCW turbines (note that the symbols +, −, ~ refer to the trends of increase, decrease, and remaining the same, respectively)

| | CW turbine | | | | CCW turbine | | |
|---|---|---|---|---|---|---|---|
| Scenario | $\Delta\alpha_U/\Delta\alpha_L$ | $\Delta U_{rel,U}/\Delta U_{rel,L}$ | ΔP | PDC (%) | $\Delta\alpha_U/\Delta\alpha_L$ | $\Delta U_{rel,U}/\Delta U_{rel,L}$ | ΔP |
| VV | +/+ | −/− | — | −6.5 | −/− | +/+ | +/−/− |
| VB | +/− | −/+ | −/−/+ | −4.0 | −/+ | +/− | ~/+/− |
| BV | −/+ | +/− | −/+/− | 0.2 | +/− | −/+ | −/−/+ |
| BB | −/− | +/+ | +/−/− | 1.6 | +/+ | −/− | — |

In scenario VV, the variations in a and $U_{rel}$ suggest a power decrease. The larger abs(γ) can enlarge the changes in α and $U_{rel}$, contributing to more substantial power losses, consistent with our field observation. In scenarios VB and BV, their upper and lower rotor changes in $\Delta U_{rel}$, i.e., $\Delta U_{rel,U}$ and $\Delta U_{rel,L}$, have trade-off effects on the turbine power deviations. The wind veer effect on the upper rotor is more significant than that on the lower rotor, primarily because the higher wind speeds at higher elevations are less influenced by the ground interaction and tower shadow. As a result, scenarios VB and BV tend to have small power losses and power gains, respectively. Besides, a varies significantly under a larger abs(γ) condition, which may lead to a detrimental effect on the power output and support the corresponding field findings of low PDCs in FIG. 11A. In scenario BB, the increase in ($U_{rel}$ is inclined to generate appreciable power gains, while the changes in α may eliminate such benefits, in good agreement with our field observations. Note that unlike the wind shear flows with a stronger effect on the upper rotor, the uniform inflows tend to have equal effects on the upper and lower rotors. It should be noted the turbine rotor rotating direction plays an important role in estimating the wind veer effect on turbine power production in each scenario. Table 11 compares the analysis results for a turbine with different rotation directions, i.e., clockwise (CW) and counterclockwise (CCW). Interestingly, the estimated power deviations in scenarios VV, VB, BV, and BB for a CW turbine correspond to the results in scenarios BB, BV, VB, and VV for the CCW turbine.

Based on the daily variation of percent occurrences of the four scenarios shown in FIG. 4C and the corresponding PDC values listed in Table II, the power deviation for each hour of the day may be estimated using Equation 1, below.

$$PDC = w_{VV}PDC_{VV} + w_{VB}PDC_{VB} + w_{BV}PDC_{BV} + w_{BB}PDC_{BB}, \quad (1)$$

In Equation 1, w represents the weight of the scenario, corresponding to its occurrence percentage. The estimation has a strong correlation with the field observation of 0.88.

Figure 12:
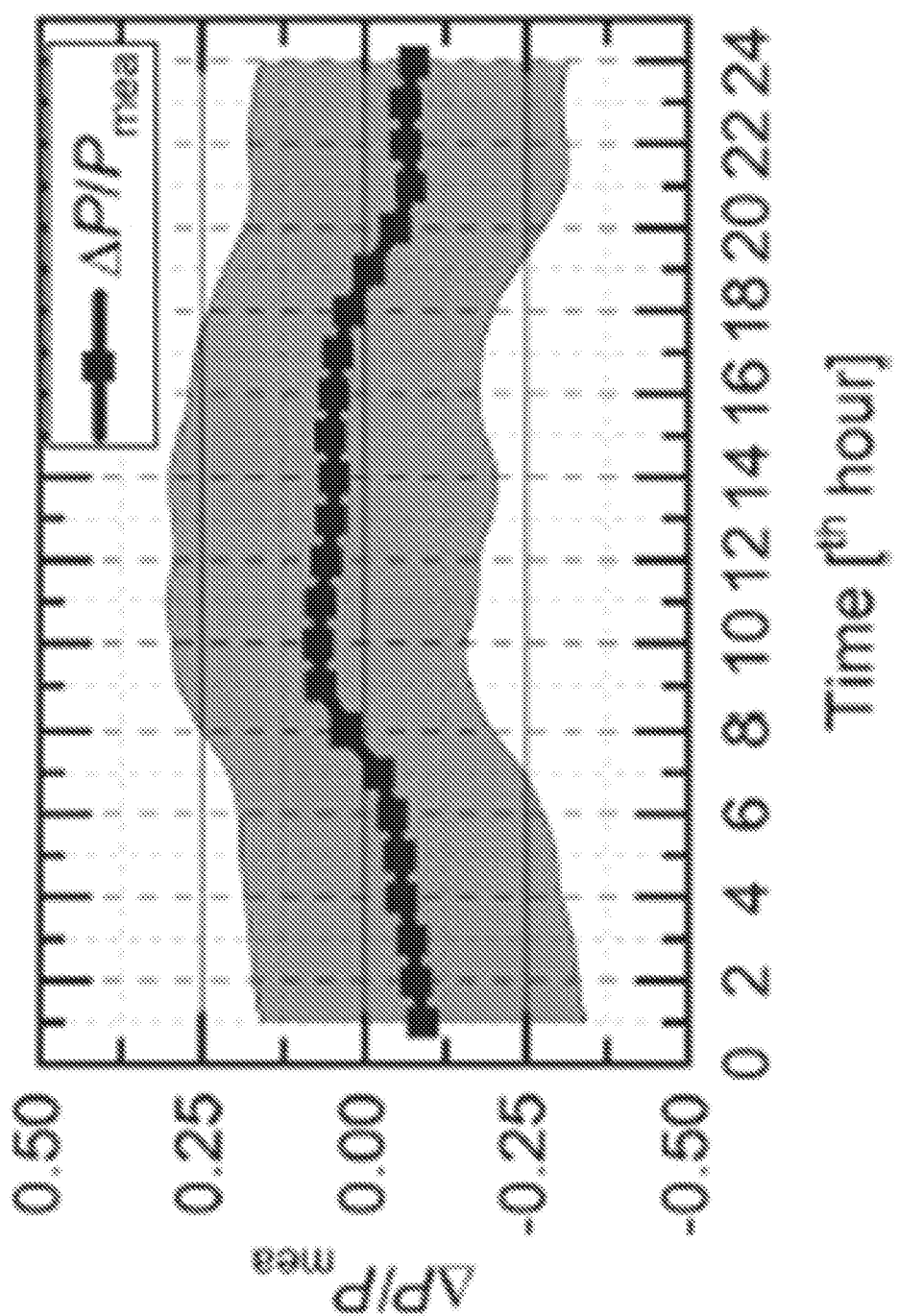
FIG. 12 shows average diurnal variation of the normalized power deviation of an example wind turbine.

FIG. 12 shows average diurnal variation of the normalized power deviation ($\Delta P/P_{mea}$). The gray shaded region corresponds to ±11 standard deviation. As shown in FIG. 12, the turbine is more likely to yield power loss and gain during nighttime and daytime, respectively.

To reiterate, the wind veer characteristics and their impact on the power performance of a utility-scale wind turbine (2.5

MW) were investigated using a five-year field dataset measured at the Eolos Wind Energy Research Station of the University of Minnesota in Rosemount, Minnesota (44° 44'01.4"N, 93° 05'04.4"W). This field dataset consists of the turbine operational conditions recorded in the turbine SCADA system and inflow conditions for wind veer characterization measured with a well-instrumented met tower located 1.77 D upstream of the turbine. At the Eolos station, although there are more backing wind cases than the veering cases, the overall wind veer across the rotor exhibits a small positive value of 0.002°/m (i.e., veering), associated with higher probabilities of higher-magnitude veering winds. Such a trend is consistent with the Ekman spiral effect and inertial oscillation in the Northern Hemisphere and also matches the observations at Lubbock, Texas. The main contributions/findings are summarized below. Dividing the wind veer conditions into four scenarios based on their changes in turbine upper and lower rotors is proposed: VV (upper rotor: veering, lower rotor: veering), VB (upper rotor: veering, lower rotor: backing), BV (upper rotor: backing, lower rotor: veering), and BB (upper rotor: backing, lower rotor: backing). The presence and proportion of different scenarios are strongly associated with the geographic location of a turbine site. In our case, scenarios VV, VB, BV, and BB comprise 18%, 2%, 56%, and 24% of the entire dataset, respectively, which are potentially associated with the location of the Eolos station in the vicinity of the low-pressure center and the relatively higher unstable atmospheric boundary layer. Besides, the occurrence ratio of different scenarios exhibits a clear diurnal pattern. Scenario VV is more likely to occur during the stable nighttime periods, while scenario BB tends to occur during the daytime with convective/unstable flows. The other two scenarios almost have the same proportions throughout a day. Such trends agree with the field observations in Lubbock, Texas, and central Iowa, suggesting that such trends are generalizable in most onshore wind sites in the Northern Hemisphere. In comparison with the diurnal variation, the annual variation is relatively inappreciable in our site, unlike the significant seasonal differences reported for an offshore site off the Massachusetts coast. Moreover, our observation shows that in scenarios VV and VB, the upper rotor wind veer ($\gamma_U$) exhibits higher magnitudes (doubled) than those of the lower rotor ($\gamma_U$), primarily related to the strong wind shear at lower elevations. Reverse trends observed in scenarios BV and BB are potentially associated with the passage of cold fronts.

The division of wind veer into different scenarios allows us to elucidate its impact on turbine power generation. For clockwise (CW) turbines (like the Eolos turbine in our case), substantial power loss is expected in scenario VV (about 6.5% in our case), while a small amount of power gain can occur in scenario BB (about 1.6% in our case). In comparison with scenarios VV and BB, the power deviations in scenarios VB and BV are relatively smaller due to the neutralization of the upper and rotor behaviors. Such field assessment is supported by a theoretical analysis of the velocity triangle of a blade element. The main influences of wind veer are the variations in the angle of attack ($\alpha$) and relative wind speed ($U_{rel}$). The veering wind tends to lead to the increase in $\alpha$ and the decrease in $U_{rel}$. In contrast, the backing wind tends to result in the decrease in $\alpha$ and the increase in $U_{rel}$, consistent with the simulations by R. Wagner, M. S. Courtney, T. J. Larsen, and U. S. Paulsen, "Simulation of shear and turbulence impact on wind turbine performance," Riso-R-Report No. 1722(EN), 2010. Phys (hereinafter, "Wagner et al."). These changes may significantly degrade the designed power coefficient and modify the aerodynamic forces acting on the blades, resulting in substantial power deviations. Additionally, the turbine rotational direction plays a vital role in the turbine power generation under wind veer conditions. The counterclockwise (CCW) turbine follows an exactly opposite trend to the CW turbine. i.e., the estimated power deviations in scenarios VV, VB, BV, and BB for a CCW turbine are equivalent to the results in scenarios BB, BV, VB, and VV for a CW turbine.

The aforementioned findings can provide practical guidance for the wind farm macro/micro-siting to achieve the maximum profits. Based on the proportion of different scenarios that depends on the geographic location of the turbine site, our study provides a direct formulation to estimate the power losses associated with the wind veer, which can be used as a valuable reference for the decision making of wind site investment, particularly in the trend of turbine maximization. Furthermore, introducing wind veer as a valid index in the standard wind resource assessment is suggested. Specifically, based on the proportion of different scenarios estimated based on the one-year met tower data before the wind farm construction, wind farm operators can select proper types of wind turbines in terms of turbine rotational direction for more power generation. CCW turbines are more advantageous if the site prevails with scenarios VV and VB. Otherwise, CW turbines are suggested. Moreover, the adjustment of the turbine rotational direction according to the diurnal variation of wind veer can also be beneficial for the turbine power generation. Operations in the counterclockwise rotation mode and clockwise rotation mode are profitable at nighttime and daytime, respectively, for onshore wind sites in the Northern Hemisphere. Such improvements may involve a novel design of the symmetric blades. Nevertheless, it should be noted that the field measurements of the wind directions used for the wind veer calculation involve a small uncertainty on the order of 0.01°/m (i.e., ±0.7° across the entire span of the rotor), which is negligible and treated as the no veer condition in the present study. In addition, the Eolos turbine has a small chance (4%) to operate in region 3 with variable-pitch regulation. The field measurements mainly support the findings when the turbine is in the variable-speed regulation regions (region 1.5, region 2, and region 2.5). It should be cautioned to extend the derived field measurement results and theoretical analysis to region 3 of the turbine with pitch regulations.

Figure 13:
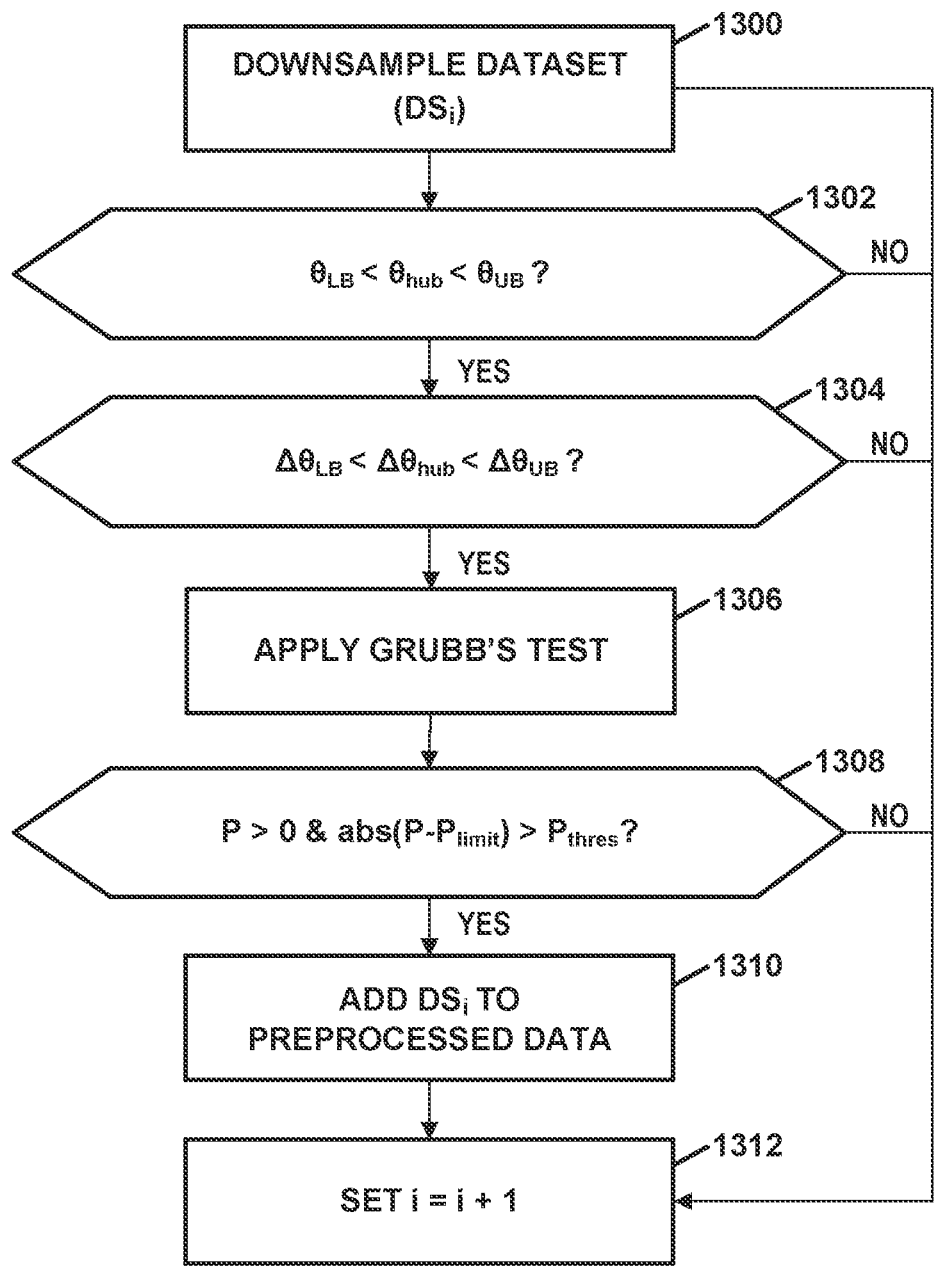
FIG. 13 is a flow diagram showing an example process for preprocessing data and criteria for wind veer characterizations.

FIG. 13 is a flow diagram showing an example process for preprocessing data and criteria for wind veer characterizations. As shown in FIG. 13, a data preprocessing procedure may include downsampling a raw dataset $DS_i$ (1300). For example, processing circuitry (e.g., processing circuitry 16 or processing circuitry of another computing system) may smooth the raw dataset by averaging consecutive sets of 120 data points (e.g., 2-min arithmetic averages based on 1 Hz raw data) to diminish high-frequency fluctuations associated with small-scale wind structures.

To guarantee the met tower measurements represent the inflow conditions for the turbine, processing circuitry may determine whether the hub-height wind direction ($\theta_{hub}$) is between lower and upper bounds for hub-height wind direction ($\theta_{LB}$, $\theta_{UB}$, respectively) (1302). In some examples, $\theta_{LB}$ is set to 90°, and $\theta_{UB}$ is set to 270°. If $\theta_{hub}$ is not greater than $\theta_{LB}$ and less than $\theta_{UB}$ ("NO" branch of 1302), processing circuitry may discard this datapoint and/or dataset and process the next datapoint and/or dataset (1312).

If $\theta_{hub}$ is greater than $\theta_{LB}$ and less than $\theta_{UB}$ ("YES" branch of 1302), processing circuitry may determine whether the change in hub-height wind direction ($\Delta\theta_{hub}$) is between upper and lower bounds for change in hub-height wind direction ($\Delta\theta_{LB}$, $\Delta\theta_{UB}$, respectively) (1304). In some examples, $\Delta\theta_{LB}$ is set to −180, and $\Delta\theta_{UB}$ is set to 180. If $\Delta\theta_{hub}$ is not greater than $\Delta\theta_{LB}$ and less than $\Delta\theta_{UB}$ ("NO" branch of 1304), processing circuitry may discard this datapoint and/or dataset and process the next datapoint and/or dataset (1312).

If $\Delta\theta_{hub}$, is greater than $\Delta\theta_{LB}$ and less than $\Delta\theta_{UB}$ ("YES" branch of 1304), processing circuitry may apply Grubb's test to the remaining data (1306). As noted above, wind veer across the turbine rotor, or γ, may be calculated using the following equation: $\gamma=(\theta_{TT}-\theta_{BT})/(z_{TT}-z_{BT})$, where TI and BT are short for the blade top tip and bottom tip, respectively. Grubbs's test, which may be used for outlier detection, may involve assuming that the dataset follows a normal distribution with a detection threshold factor ranging from 0 to 1, where values close to 0 result in a smaller number of outliers and values close to 1 result in a larger number of outliers. Processing circuitry may apply Grubb's test with a threshold of 0.05 and discard data determined to be outliers per Grubb's test (1306).

To have a better linkage between the inflow conditions and the turbine performance, processing circuitry may determine whether P>0 & abs(P-$P_{limit}$)>$P_{thres}$ (1308). In other words, processing circuitry may determine whether the power (P) is greater than 0 and whether the magnitude of the difference between the power and a power limit ($P_{limit}$) exceeded a threshold ($P_{thres}$). In some examples, ($P_{thres}$) is set to 5%. If processing circuitry determines that P is not greater than 0 or abs(P-$P_{limit}$) is not greater than $P_{thres}$ ("NO" branch of 1308), then processing circuitry may discard this datapoint and/or dataset and process the next datapoint and/or dataset (1312). However, if processing circuitry determines that P is greater than 0 and abs(P-$P_{limit}$) is greater than $P_{thres}$ ("YES" branch of 1308), processing circuitry may add whatever data is remaining of $DS_i$ to preprocessed data. The investigation described herein used the quality control procedures and data clean criteria of FIG. 13, which yielded 361,433 data points (equivalent to 12,048 hours of data) for analysis.

Figure 14:
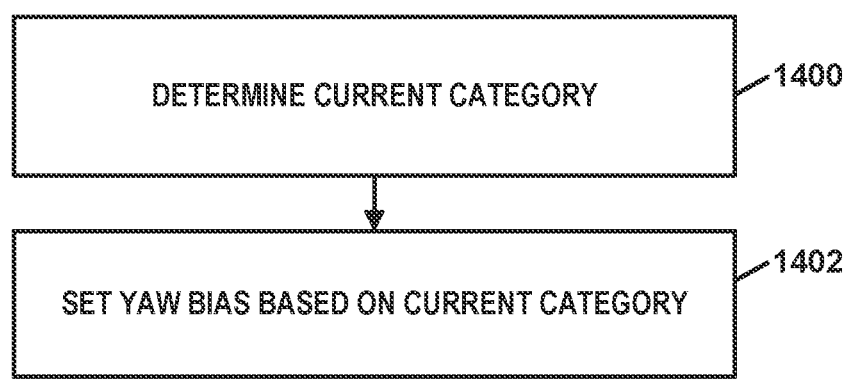
FIG. 14 is a flow diagram showing an example process that an example control system uses to adjust the yaw bias of a wind turbine in accordance with techniques of this disclosure.

FIG. 14 is a flow diagram showing an example process that control system 12 may use to determine whether to adjust the yaw bias of wind turbine 14 having rotors configured to rotate in the clockwise direction. As shown in FIG. 14, control system 12 may determine a current category of an incoming wind approaching wind turbine 14 (1400). The categories may include the following scenarios:

Scenario VV: veering (upper rotor) and veering (lower rotor), as shown in FIG. 9A.
Scenario VB: veering (upper rotor) and backing (lower rotor); as shown in FIG. 9B.
Scenario BV: backing (upper rotor) and veering (lower rotor); as shown in FIG. 9C.
Scenario BB: backing (upper rotor) and backing (lower rotor); as shown in FIG. 9D.

In some examples, control system 12 may determine the current category of the incoming wind based on measurements from sensors of a separate meteorological tower or based on sensors mounted on wind turbine 14 itself. Such sensors may include LiDAR sensors, anemometers, and/or other types of sensors. In examples where the sensors include LiDAR sensors mounted on wind turbine 14, the LiDAR sensors may include nacelle-mounted LiDAR sensors, spinning hub-mounted LiDAR sensors, and/or ground scanning LiDAR sensors.

Control system 12 may determine the change in wind direction along the lower rotor of wind turbine 14 as $\gamma_L=(WD_{hub}-WD_{bottom})/(D/2)$ and may determine the change in wind direction along the upper rotor of wind turbine 14 as $\gamma_U=(WD_{top}-WD_{hub})/(D/2)$, where $WD_{hub}$ indicates a wind direction at the hub height, $WD_{bottom}$ indicates a wind direction at the bottom of the lower rotor, $WD_{top}$ indicates a wind direction at the top of the upper rotor, and D indicates a rotor diameter of the turbine. If, $\gamma_L$ indicates a change in wind direction in a clockwise direction (e.g., $\gamma_L>0$), then control system 12 may determine that the lower rotor is experiencing a veering wind. Conversely, if $\gamma_L$ indicates a change in wind direction in a counterclockwise direction (e.g., $\gamma_L<0$), then control system 12 may determine that the lower rotor is experiencing a backing wind. If $\gamma_U$ indicates a change in wind direction in a clockwise direction (e.g., $\gamma_U>0$), then control system 12 may determine that the upper rotor is experiencing a veering wind. Conversely, if $\gamma_U$ indicates a change in wind direction in a counterclockwise direction (e.g., $\gamma_U<0$), then control system 12 may determine that the upper rotor is experiencing a backing wind. Note that these determinations pertain to a wind turbine located in the Northern hemisphere.

Control system 12 may set a yaw bias of rotors 18 based on the current category (1402). For instance, control system 12 may store a separate set of tables for each of the categories. For each of the categories, the set of tables for the category includes tables for different incoming wind speeds at the hub of wind turbine 14. A table for an incoming wind speed at the hub height of wind turbine 14 may specify yaw bias values for different combinations of the change in wind direction along the lower rotor of wind turbine 14 and the change in wind direction along the upper rotor of wind turbine 14.

Figure 15:
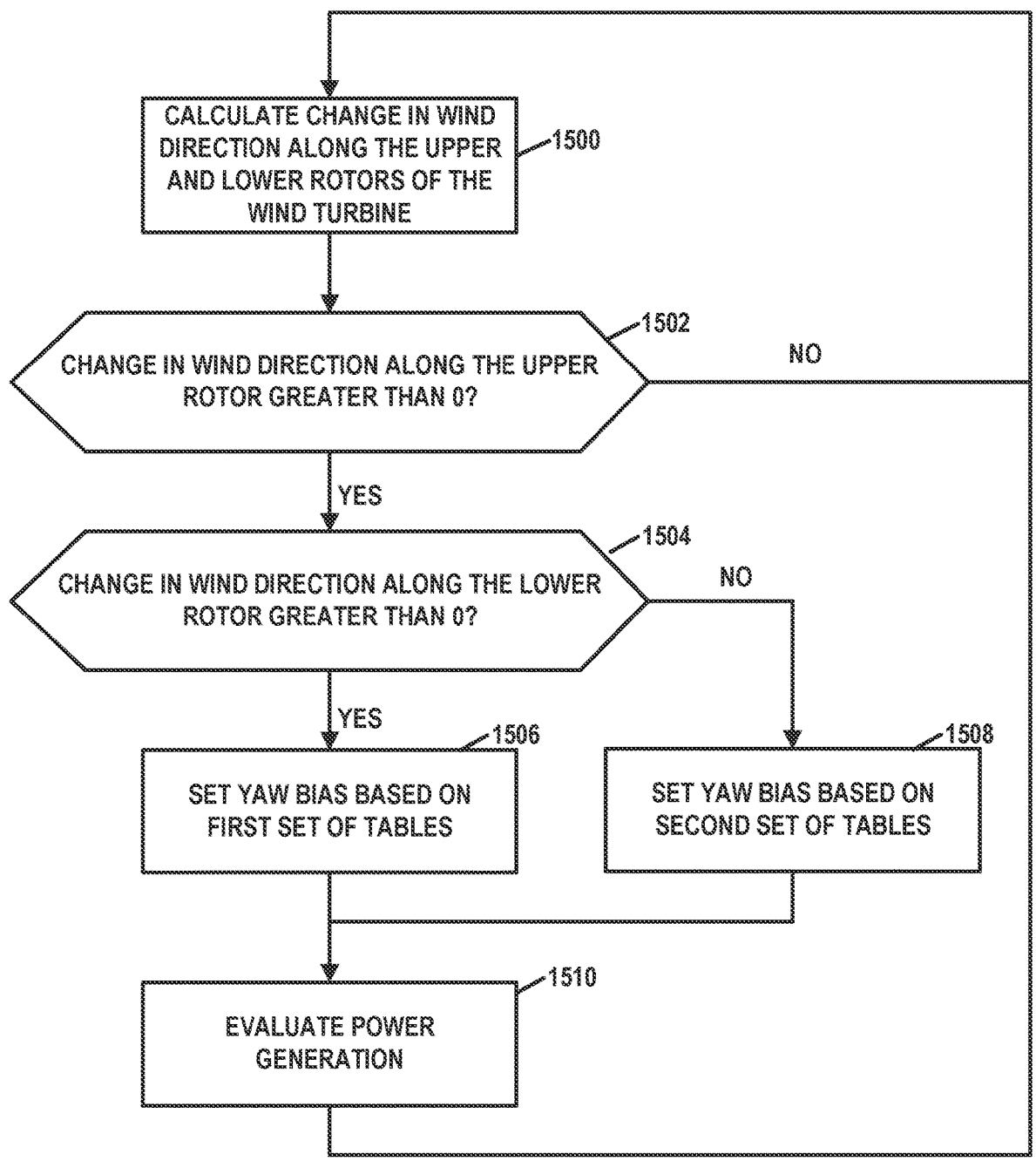
FIG. 15 is a flow diagram showing another example process that an example control system uses to adjust the yaw bias of a wind turbine in accordance with techniques of this disclosure.

FIG. 15 is a flow diagram showing an example process that control system 12 may use to determine whether to adjust the yaw bias of wind turbine 14 having rotors configured to rotate in the clockwise direction. Because the rotors of wind turbine 14 are configured to rotate in the clockwise direction, a reduction in power generation would only occur in the VV and VB categories, the controller only adjusts the yaw bias when the incoming wind is in the VV and VB categories (i.e., when $\gamma_U>0$). Moreover, it may not be advantageous to adjust the yaw bias if $\gamma_U$ and $\gamma_L$ are too small (e.g., if |$\gamma_U$| is not >0.1°/m or |$\gamma_L$| is not >0.1°/m). In this flowchart, it is assumed that wind speed and direction are measured from a meteorological tower (met tower). If the direction from wind turbine 14 to the met tower is not within a range of 90° to 270°, i.e., the direction measurements significantly affected by the turbine wakes, control system 12 does not adjust the yaw bias of wind turbine 14 based on data from the met tower. In examples where wind speed and direction are measured by instruments mounted on wind turbine 14, this step of the flowchart may be skipped.

As shown in FIG. 15, control system 12 may calculate a change in wind direction along the upper and lower rotors of wind turbine 14 (1500). Control system 12 may determine the change in wind direction along the lower rotor of wind turbine 14 as $\gamma_L=(WD_{hub}-WD_{bottom})/(D/2)$ and may determine the change in wind direction along the upper rotor of wind turbine 14 as $\gamma_U=(W_{top}-WD_{hub})/(D/2)$, where $WD_{hub}$ indicates a wind direction at the hub height. $WD_{bottom}$ indicates a wind direction at the bottom of the lower rotor, $WD_{top}$ indicates a wind direction at the top of the upper rotor, and D indicates a rotor diameter of the turbine.

Control system 12 may determine whether the change in wind direction along the upper rotor is greater than 0 (1502). If the change in wind direction along the upper rotor is not greater than 0 ("NO" branch of 1502), adjusting a yaw bias of wind turbine 14 may be skipped (e.g., until the operation of the flowchart is repeated). If the change in wind direction along the upper rotor is greater than 0 ("YES" branch of 1502), control system 12 may determine whether the change in wind direction along the lower rotor is greater than 0 (1504). If the wind category is VV (i.e., $\gamma_U>0$ and $\gamma_L>0$) ("YES" branch of 1504), control system 12 may use a first algorithm (e.g., a first set of tables) to determine the yaw bias (1506). If the category is VB (i.e., $\gamma_U>0$ and if $\gamma_L<0$) ("NO" branch of 1504), control system 12 may use a second algorithm (e.g., a second set of tables) to adjust the yaw bias (1508). After setting the yaw bias, control system 12 may perform an evaluation to determine whether the change in the yaw bias increased power generation (1510). In some examples, based on the evaluation, control system 12 may adjust the values of the yaw bias in the set of tables. For instance, if the change in the yaw bias increased or decreased power generation, control system 12 may reset the yaw bias or set the yaw bias to another value based on the wind conditions (and perform another evaluation). For instance, control system 12 may update yaw bias values in a table, such as the table shown in the example of FIG. 5, based on the increase or decrease of power generation. Thus, in some examples, control system 12 may evaluate a change in power generation by the wind turbine after setting the yaw bias of the wind turbine based on the current category increased. Control system 12 may update a yaw bias value corresponding to the current category based on the change in power generation of the wind turbine. Control system 12 may finalize the adjustments to the values of the yaw bias at the end of an evaluation period. In this way, control system 12 may advantageously improve the effectiveness of the algorithms in increasing power generation of wind turbine 14.

Control system 12 may repeat the operation of the flowchart on a periodic basis (e.g., once every 5-10 minutes). In other examples, such as with wind turbine 14 having counterclockwise rotating rotors, control system 12 may only make adjustments to the yaw bias when the incoming wind is in the BV or BB categories.

This disclosure includes various examples, such as the following examples.

Example 1: A method in accordance with any of the techniques described in this disclosure.

Example 2: A wind turbine configured in accordance with any of the techniques described in this disclosure.

Example 3: A computer-readable data storage medium having instructions stored thereon that cause a wind turbine to perform techniques described in this disclosure.

Example 4: A method comprising: determining, by a control system, from among a plurality of categories, a current category of an incoming wind approaching a wind turbine, the plurality of categories including two or more of: a first wind condition in which wind contacting an upper rotor of the wind turbine is veering and wind contacting a lower rotor of the wind turbine is veering, a second wind condition in which the wind contacting the upper rotor of the wind turbine is veering and the wind contacting the lower rotor of the wind turbine is backing, a third wind condition in which the wind contacting the upper rotor of the wind turbine is backing and the wind contacting the lower rotor of the wind turbine is veering, and a fourth wind condition in which the wind contacting the upper rotor of the wind turbine is backing and the wind contacting the lower rotor of the wind turbine is backing; setting, by the control system, a yaw bias of the wind turbine based on the current category.

Example 5: The method of example 4, wherein setting the yaw bias of the wind turbine comprises, setting, by the control system, the yaw bias of the wind turbine based on the current category, an incoming wind speed at a hub height of the wind turbine, a change in wind direction along the lower rotor of the wind turbine, and a change in wind direction along the upper rotor of the wind turbine.

Example 6: A wind turbine control system configured to operate in accordance with any of the techniques described in this disclosure.

In one or more examples, the algorithms, operations and functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

The invention claimed is:

1. A method comprising:
   determining, by a control system, from among a plurality of categories, a current category of an incoming wind approaching a wind turbine, the plurality of categories including three or more of:
   a first wind condition in which wind contacting an upper rotor of the wind turbine is veering and wind contacting a lower rotor of the wind turbine is veering, a second wind condition in which the wind contacting the upper rotor of the wind turbine is veering and the wind contacting the lower rotor of the wind turbine is backing, a third wind condition in which the wind contacting the upper rotor of the wind turbine is backing and the wind contacting the lower rotor of the wind turbine is veering, or a fourth wind condition in which the wind contacting the upper rotor of the wind turbine is backing and the wind contacting the lower rotor of the wind turbine is backing; and setting, by the control system, a yaw bias of the wind turbine according to a yaw bias value determined based on the current category.

2. The method of claim 1, wherein the setting the yaw bias of the wind turbine comprises, setting, by the control system, the yaw bias of the wind turbine based on the current category and one or more of an incoming wind speed at a hub height of the wind turbine, a change in a wind direction along the lower rotor of the wind turbine, or a change in a wind direction along the upper rotor of the wind turbine.

3. The method of claim 2, wherein the setting the yaw bias of the wind turbine is in response to the change in the wind direction along the upper rotor of the wind turbine being greater than 0.

4. The method of claim 1, further comprising setting the yaw bias value of the wind turbine by referencing one or more sets of tables stored in the control system, wherein the one or more sets of tables comprise the yaw bias value.

5. The method of claim 4, wherein the one or more sets of tables comprises a first set of tables and a second set of tables, and wherein the setting the yaw bias of the wind turbine comprises:

setting the yaw bias of the wind turbine to a first yaw bias value from the first set of tables in response to a change in a wind direction along the upper rotor of the wind turbine being greater than 0 and a change in a wind direction along the lower rotor of the wind turbine being greater than 0; and setting the yaw bias of the wind turbine to a second yaw bias value from the second set of tables in response to the change in the wind direction along the upper rotor of the wind turbine being greater than 0 and the change in the wind direction along the lower rotor of the wind turbine being less than 0.

6. The method of claim 1, further comprising:

evaluating, by the control system, a change in power generation by the wind turbine after setting the yaw bias of the wind turbine based on the current category; and updating, by the control system, the yaw bias value corresponding to the current category based on the change in power generation of the wind turbine.

7. The method of claim 1, wherein the determining the current category of the incoming wind approaching the wind turbine comprises periodically determining an updated current category of the incoming wind approaching the wind turbine, and wherein the setting the yaw bias of the wind turbine comprises periodically setting the yaw bias of the wind turbine based on the updated current category.

8. The method of claim 1, wherein the method further comprises obtaining, by the control system, measurements from one or more sensors, wherein each of the one or more sensors is configured to measure a wind direction and a wind magnitude, and wherein the determining the current category of the incoming wind approaching the wind turbine comprises determining the current category of the incoming wind approaching the wind turbine based on the measurements from the one or more sensors.

9. The method of claim 8, wherein the one or more sensors are configured to determine a respective wind direction and a respective wind magnitude for each elevation of a plurality of elevations.

10. The method of claim 8, wherein the one or more sensors comprise at least one of a light detection and ranging (LiDAR) sensor or anemometer.

11. A control system comprising processing circuitry configured to perform operations comprising:

determining, from among a plurality of categories, a current category of an incoming wind approaching a wind turbine, the plurality of categories including three or more of:

a first wind condition in which wind contacting an upper rotor of the wind turbine is veering and wind contacting a lower rotor of the wind turbine is veering, a second wind condition in which the wind contacting the upper rotor of the wind turbine is veering and the wind contacting the lower rotor of the wind turbine is backing, a third wind condition in which the wind contacting the upper rotor of the wind turbine is backing and the wind contacting the lower rotor of the wind turbine is veering, or a fourth wind condition in which the wind contacting the upper rotor of the wind turbine is backing and the wind contacting the lower rotor of the wind turbine is backing; and setting a yaw bias of the wind turbine according to a yaw bias value determined based on the current category.

12. The control system of claim 11, wherein the setting the yaw bias of the wind turbine comprises setting the yaw bias of the wind turbine to the yaw bias value based on the current category and one or more of an incoming wind speed at a hub height of the wind turbine, a change in a wind direction along the lower rotor of the wind turbine, or a change in a wind direction along the upper rotor of the wind turbine.

13. The control system of claim 12, wherein the setting the yaw bias of the wind turbine comprises setting the yaw bias of the wind turbine to the yaw bias value in response to the change in the wind direction along the upper rotor of the wind turbine being greater than 0.

14. The control system of claim 11, wherein the setting the yaw bias of the wind turbine comprises setting the yaw bias of the wind turbine to the yaw bias value by referencing one or more sets of tables stored in the control system, wherein the one or more sets of tables comprise the yaw bias value.

15. The control system of claim 14, wherein the one or more sets of tables comprises a first set of tables and a second set of tables, and setting the yaw bias of the wind turbine to the yaw bias value from the one or more sets of tables comprises:

setting the yaw bias of the wind turbine to a yaw bias value from the first set of tables in response to a change in a wind direction along the upper rotor of the wind turbine being greater than 0 and a change in a wind direction along the lower rotor of the wind turbine being greater than 0; and setting the yaw bias of the wind turbine to a yaw bias value from the second set of tables in response to the change in the wind direction along the upper rotor of the wind turbine being greater than 0 and the change in the wind direction along the lower rotor of the wind turbine being less than 0.

16. The control system of claim 11, wherein the operations further comprise:
evaluating whether setting the yaw bias of the wind turbine to the yaw bias value based on the current category increased power generation by the wind turbine; and
responsive to determining that setting the yaw bias of the wind turbine to the yaw bias value based on the current category failed to increase power generation by the wind turbine, resetting the yaw bias of the wind turbine.

17. The control system of claim 11, wherein:
determining the current category of the incoming wind approaching the wind turbine comprises periodically determining an updated current category of the incoming wind approaching the wind turbine, and
the operations comprise setting the yaw bias of the wind turbine based on the current category by periodically setting the yaw bias of the wind turbine based on the updated current category.

18. The control system of claim 11, wherein the control system further comprises one or more of a memory circuitry or a communication interface.

19. A wind turbine comprising:
a plurality of rotors comprising at least an upper rotor and a lower rotor;
a nacelle, connected to each rotor of the plurality of rotors, configured to rotate so that a yaw bias of the nacelle attains a yaw bias value, wherein a control system determines the yaw bias value based on a current category of an incoming wind approaching the wind turbine, wherein the control system determines the current category from among a plurality of categories comprising three or more of:
a first wind condition in which wind contacting the upper rotor of the wind turbine is veering and wind contacting the lower rotor of the wind turbine is veering,
a second wind condition in which the wind contacting the upper rotor of the wind turbine is veering and the wind contacting the lower rotor of the wind turbine is backing,
a third wind condition in which the wind contacting the upper rotor of the wind turbine is backing and the wind contacting the lower rotor of the wind turbine is veering, or
a fourth wind condition in which the wind contacting the upper rotor of the wind turbine is backing and the wind contacting the lower rotor of the wind turbine is backing.

20. The wind turbine of claim 19, wherein the control system determines the setting based on the current category and further based on one or more of an incoming wind speed at a hub height of the wind turbine, a change in a wind direction along the lower rotor of the wind turbine, or a change in a wind direction along the upper rotor of the wind turbine.

* * * * *